(12) United States Patent
Itasaki et al.

(10) Patent No.: US 9,189,060 B2
(45) Date of Patent: Nov. 17, 2015

(54) METHOD OF CONTROLLING INFORMATION PROCESSING APPARATUS AND INFORMATION PROCESSING APPARATUS

(71) Applicant: Fujitsu Limited, Kawasaki-shi, Kanagawa (JP)

(72) Inventors: Akira Itasaki, Yokohama (JP); Tatsuro Matsumoto, Yokohama (JP); Hiroyasu Sugano, Koto (JP); Daisuke Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 13/836,573

(22) Filed: Mar. 15, 2013

(65) Prior Publication Data

US 2013/0335582 A1 Dec. 19, 2013

(30) Foreign Application Priority Data

Jun. 15, 2012 (JP) .................................. 2012-136047

(51) Int. Cl.
  *G06F 21/10* (2013.01)
  *H04L 29/08* (2006.01)
  *G06F 3/00* (2006.01)
(52) U.S. Cl.
  CPC ................ *G06F 3/005* (2013.01); *G06F 21/10* (2013.01); *H04L 67/1097* (2013.01)

(58) Field of Classification Search
  CPC ........ G96F 3/005; G96F 21/10; H04L 67/1097
  USPC ......... 348/211.1–211.3, 211.14, 222.1, 231.2
  See application file for complete search history.

(56) References Cited

U.S. PATENT DOCUMENTS

| | | | |
|---|---|---|---|
| 2005/0226413 A1* | 10/2005 | Wada | 348/231.2 |
| 2007/0174625 A1* | 7/2007 | Wuidart et al. | 713/176 |
| 2011/0276802 A1* | 11/2011 | Roberts et al. | 713/171 |
| 2012/0230349 A1* | 9/2012 | Sakoda | 370/445 |
| 2013/0031150 A1* | 1/2013 | Kamath et al. | 707/827 |

FOREIGN PATENT DOCUMENTS

| | | |
|---|---|---|
| JP | 2004-179920 | 6/2004 |
| JP | 2006-201997 | 8/2006 |
| JP | 2007-267059 | 10/2007 |
| JP | 2008-236159 | 10/2008 |
| JP | 2010-86174 | 4/2010 |

* cited by examiner

*Primary Examiner* — Gevell Selby
(74) *Attorney, Agent, or Firm* — Oblon, McClelland, Maier & Neustadt, L.L.P.

(57) ABSTRACT

A method of controlling an information processing apparatus causes contents in a first terminal to be shared with a second terminal. The method includes receiving sharing information for sharing the content from the second terminal, sending, by a processor, an acquisition request of the contents to the first terminal on a basis of the sharing information, acquiring the contents from the first terminal after the sending an acquisition request, and transmitting acquisition completion notification to the second terminal after the acquiring the contents.

15 Claims, 27 Drawing Sheets

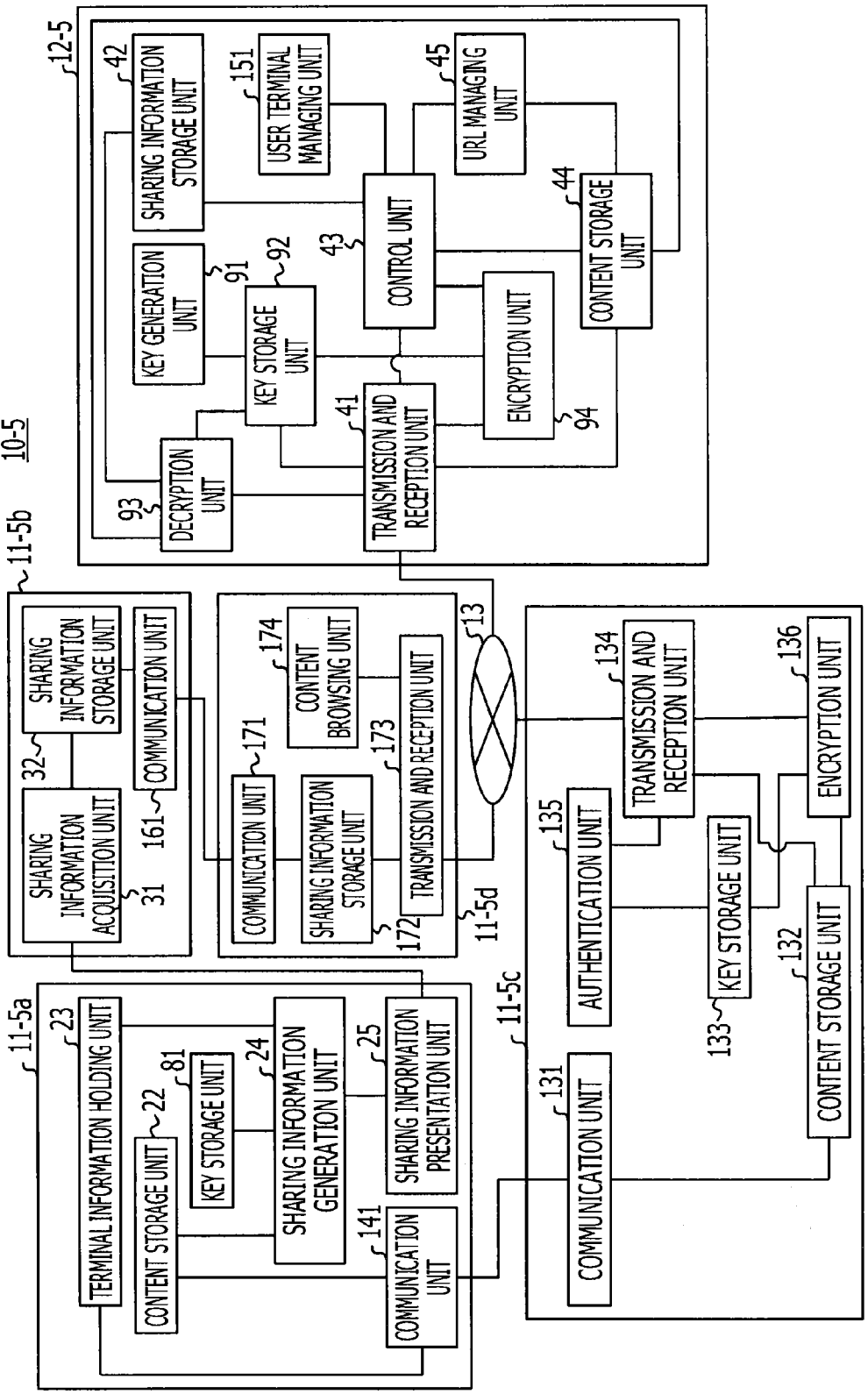

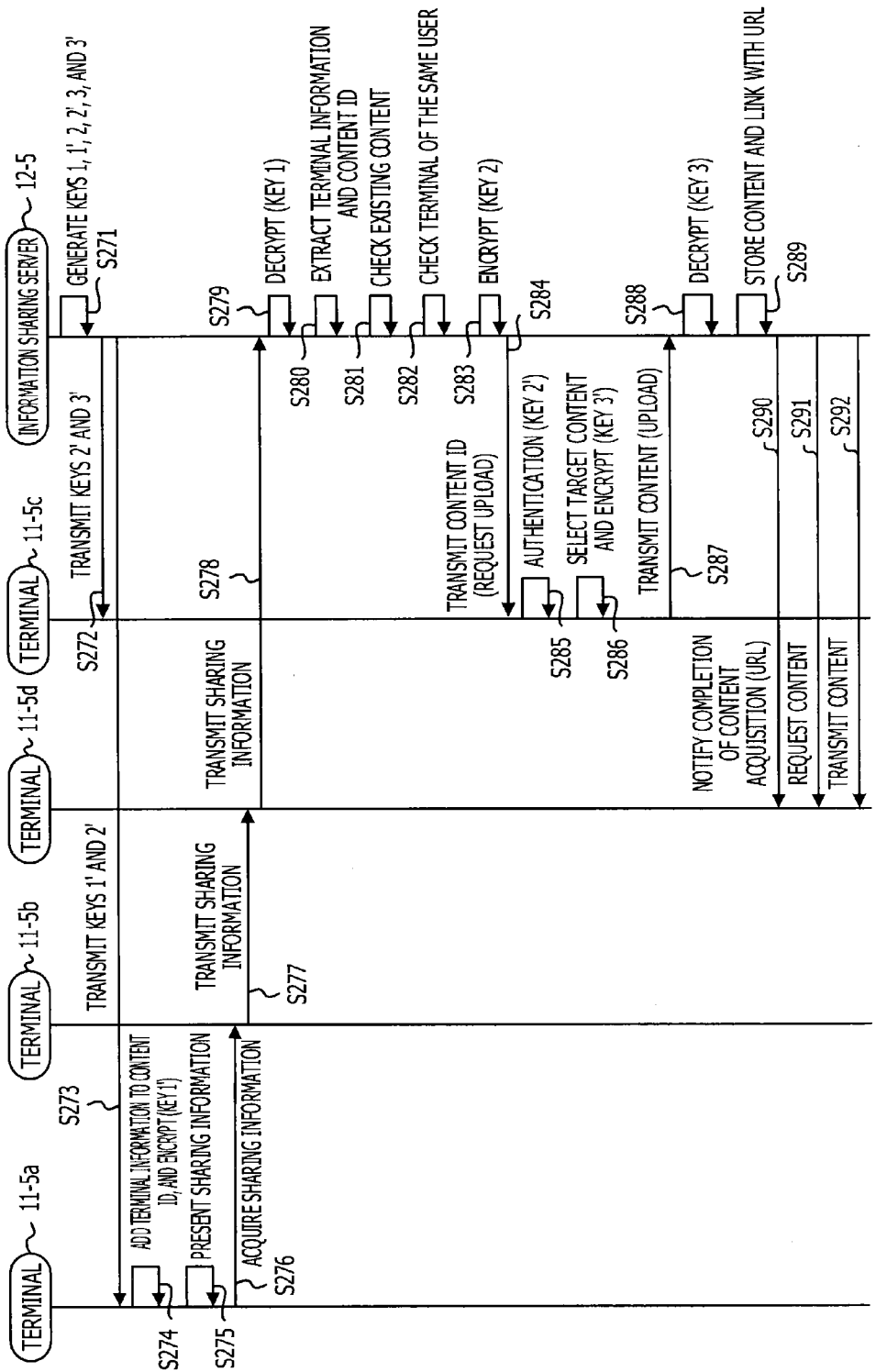

METHOD OF CONTROLLING INFORMATION PROCESSING APPARATUS AND INFORMATION PROCESSING APPARATUS

CROSS-REFERENCE TO RELATED APPLICATION

This application is based upon and claims the benefit of priority of the prior Japanese Patent Application No. 2012-136047, filed on Jun. 15, 2012, the entire contents of which are incorporated herein by reference.

FIELD

The embodiments discussed herein are related to a method of controlling an information processing apparatus and an information processing apparatus.

BACKGROUND

In the related art, advancements have been made to a system environment which shares content such as an image or a moving image captured by an imaging unit such as a camera among a plurality of devices through a communication network, for example, the Web. The system described above has been realized specifically by the widespread use of a file server or the like, for example, a cloud service or network-attached storage (NAS). In addition, in the related art, information terminals such as a smart phone and a tablet terminal have been widely used, and a life style has become common in which a user carries around various pieces of information such as content and the like, described above, by storing the pieces of information in the above-described information terminals.

In the related art, there is a method of realizing the sharing of the content as described above. For example, in the related art, there is a method of transmitting search conditions input from one camera to another camera which exists in a certain range, and image data corresponding to the conditions is searched for by the other camera that subsequently transmits a search result to the one camera. In addition, in the related art, there is a method of capturing a screen of a terminal device of a user with a camera, scanning authenticated face images, and reading out an authentication code embedded as a digital watermark to collate the authentication code with an authentication code recorded in a ticketing history. In the related art, there is a method of receiving identification information from a transmission target terminal and linking the identification information to a captured image. Further, in the related art, there is a method of uploading an image at the time of capturing, and receiving a QR Code™ corresponding to a storage location of the image, or a mechanism of transmitting an index of a captured image to a sharing destination However, an owner who already has content such as the image or the moving image described above has a low motivation for sharing the content with others. Thus, in the related art, if others want the content which is owned by the owner, the content is not shared in many cases. This problem is originated from the fact that an environment where the content is easily shared is not prepared, for example. In the environment where content is not easily shared, for example, access to a network may be difficult when browsing content by a tablet terminal or the like is desired, or although image content may be previewed by a camera or the like, web access or sharing setting may be difficult. Further, even though the methods of the related art described above are used, it is difficult to realize simplification of information sharing.

For example, see Japanese Laid-open Patent Publication Nos. 2004-179920, 2006-201997, 2007-267059, 2008-236159, and 2010-86174.

SUMMARY

According to an aspect of the invention, a method of controlling an information processing apparatus that causes contents in a first terminal to be shared with a second terminal, the method including receiving sharing information for sharing the content from the second terminal, sending, by a processor, an acquisition request of the contents to the first terminal on a basis of the sharing information, acquiring the contents from the first terminal after the sending an acquisition request, and transmitting acquisition completion notification to the second terminal after the acquiring the contents.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 26 is a diagram illustrating an example of a schematic configuration of an information sharing system of a fifth embodiment; and FIG. 27 is a sequence diagram illustrating an example of an information sharing process of the fifth embodiment.

DESCRIPTION OF EMBODIMENTS

Hereinafter, examples will be described in detail with reference to the accompanied drawings.

First Embodiment (Schematic Configuration Example of Information Sharing System)

Figure 1:
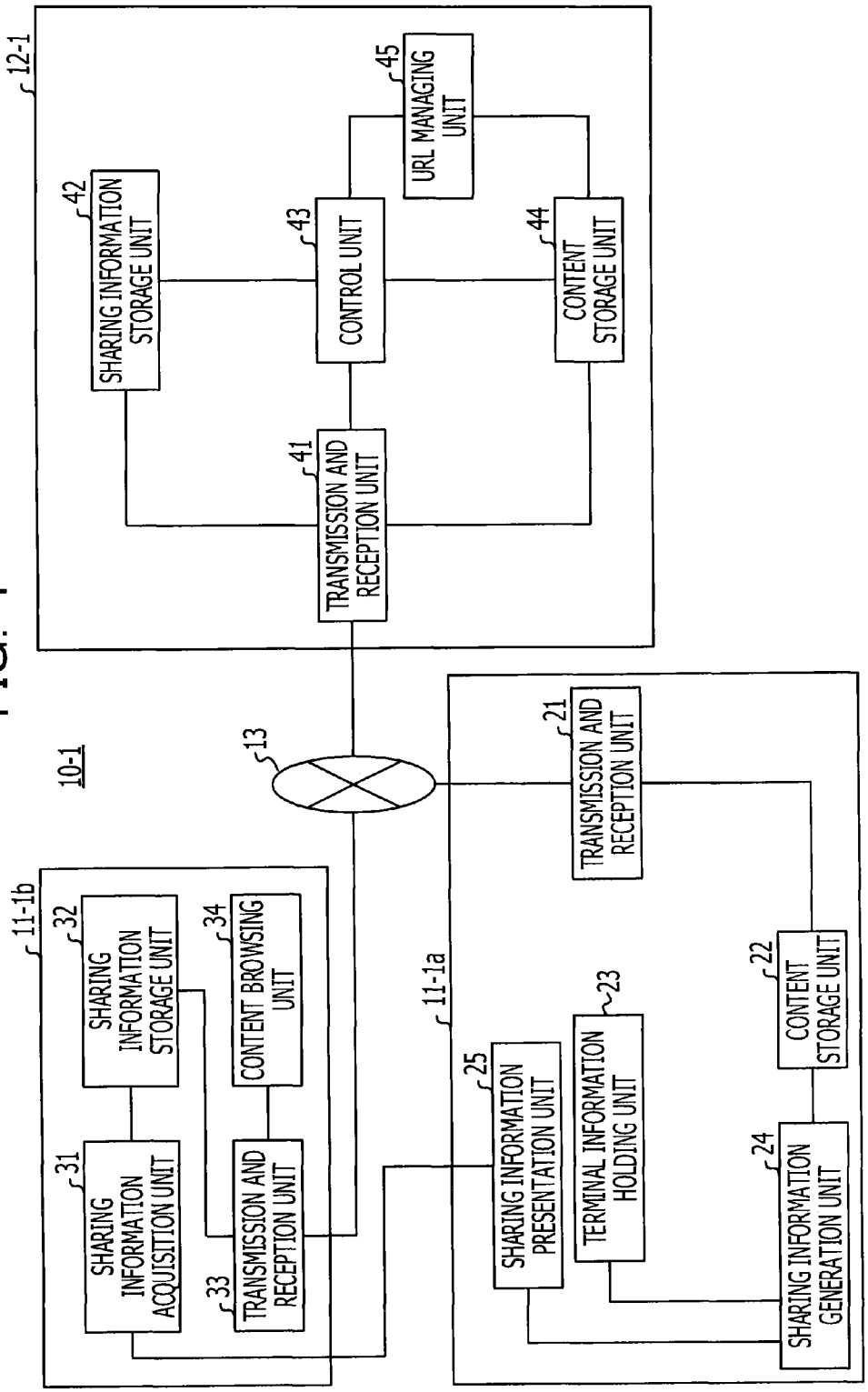
FIG. 1 is a diagram illustrating an example of a schematic configuration of an information sharing system of a first embodiment.

FIG. 1 is a diagram illustrating an example of a schematic configuration of an information sharing system of a first embodiment. An information sharing system 10-1 illustrated in FIG. 1 includes a plurality of terminals 11-1a and 11-1b (hereinafter, collectively referred to as "terminals 11-1" if desired), and an information sharing server 12-1. In addition, the terminals 11-1 and the information sharing server 12-1 which is an example of an information processing apparatus, are connected in a state of being able to transmit and receive data through a communication network 13 or the like which is represented by the Internet or the like, for example. The communication network 13 may be wired or wireless, and may be a combination thereof.

The terminal 11-1a is a terminal (first terminal) which retains original information (for example, content) to be shared. Accordingly, a user who uses the terminal 11-1a is a content owner, for example. In addition, in the following description, if desired, image content (hereinafter, simply called an "image") is used as an example of information to be shared, however, types of information are not limited thereto and a moving image, text data, a data file, and the like are included therein, for example. When sharing retained information with other users, the terminal 11-1a generates information (sharing information) related to information (content) to be shared, and presents the generated sharing information to another terminal (for example, terminal 11-1b). In addition, the sharing information includes identification information (for example, content ID) for identifying information to be shared, for example, or terminal information (information for identifying the terminal 11-1a), but it is not limited thereto.

In addition, in a case of an upload request of information to be shared from the information sharing server 12-1, the terminal 11-1a performs an upload of corresponding information.

The terminal 11-1b is a terminal (second terminal) which acquires information (image) or the like to be shared retained by the terminal 11-1a. Accordingly, a user using the terminal 11-1b is a content sharer, for example.

In the first embodiment, the terminal 11-1b does not directly receive information to be shared from the terminal 11-1a, but, first, acquires information (sharing information) related to information to be shared from the terminal 11-1a. Next, the terminal 11-1b acquires information to be shared from the information sharing server 12-1 using the acquired sharing information. As described above, the reason of acquiring the information using the information sharing server 12-1 is that in a case of a function of performing transmission and reception of data between two terminals not being given, or in a case of performing infrared data communication between two terminals, a problem, for example, of both terminals not being moved over a long period until the completion of transmission of data may occur, if information to be shared is image data or the like having large content.

That is, in the first embodiment, by acquiring only sharing information in the terminal 11-1b first and then transmitting sharing information to the information sharing server 12-1 in the remaining time, it is possible to acquire information (content) of objects at own timing.

In addition, as the terminal 11, for example, a smart phone, a tablet terminal, a note type personal computer (PC), a personal digital assistant (PDA), a game device, and the like are included; however, it is not limited thereto.

The information sharing server 12-1 is an information processing apparatus which shares information (content) between a plurality of terminals, for example. If the sharing information is acquired from the terminal 11-1b, in a case where the information sharing server 12-1 may communicate with the terminal 11-1a, the information sharing server 12-1 acquires information (content) corresponding to the sharing information and stores the acquired information (content) in a certain place. In addition, the information sharing server 12-1 transmits storage destination information (for example, address information such as Uniform Resource Locator (URL)) or the like to the terminal 11-1b. Further, when an access request corresponding to the address information from the terminal 11-1b is received, the information sharing server 12-1 allows the terminal 11-1b to browse the shared information (content).

Herein, the information sharing server 12-1 may use a cloud server or the like, for example. Herein, the cloud server performs a cloud service which may give a function to each of a plurality of apparatuses connected to the network regardless of locations of data or software, for example, and which may extract desired information, if desired. Thus, the information sharing server 12-1 may be one apparatus, or may include a plurality of apparatuses.

As described above, in the first embodiment, by sending an acquisition request of content to the terminal of the content owner from the server side to upload from the terminal, and managing the content as the information to be shared, it is possible to reduce time and effort of the content owner side and easily share the information. Next, the terminals 11-1a and 11-b and the information sharing server 12-1 of the first embodiment will be described in detail.

First Embodiment: Configuration Example of Function of Terminal 11-1a

The terminal 11-1a illustrated in FIG. 1 includes a transmission and reception unit 21, a content storage unit 22, a terminal information holding unit 23, a sharing information generation unit 24, and a sharing information presentation unit 25.

The transmission and reception unit 21 receives a connection request or a content request from the information sharing server 12-1 through the communication network 13. In addition, the transmission and reception unit 21 transmits content corresponding to the content request stored in the content storage unit 22 to the information sharing server 12-1.

The content storage unit 22 is a memory unit which stores various content items such as an image, a moving image, and the like acquired by the terminal 11-1a. The various content items may be an image, a moving image, and the like captured by an imaging unit such as a camera provided in the terminal 11-1a or the like, for example, or may be a text file created using an application for text creation or the like installed in the terminal 11-1a or the like. In addition, the various content items may be information acquired by the terminal 11-1a from the communication network 13 or the like through the Internet or by mail.

The terminal information holding unit 23 holds terminal information (for example, an IP address, an access key, user information, model identification information, or the like) related to the terminal 11-1a, an address book, or various setting information items. In addition, the terminal information is information for the information sharing server 12-1 to access to the terminal 11-1a from the terminal information thereof, for example.

The sharing information generation unit 24 generates identification information with respect to content to be shared among content stored in the content storage unit 22. In detail, the sharing information generation unit 24 generates information (for example, content ID) related to information to be shared (content), and generates sharing information including the generated content ID and the terminal information obtained from the terminal information holding unit 23.

The sharing information presentation unit 25 allows another device (for example, the terminal 11-1b), or the like to present the sharing information obtained by the sharing information generation unit 24. In detail, the sharing information presentation unit 25 includes a display unit such as a monitor, for example, which displays the sharing information by the display unit, and allows the terminal 11-1b to obtain the sharing information, for example. In addition, the sharing information presentation unit 25 generates a two-dimensional code such as a QR code or the like including the sharing information, and displays the generated two-dimensional code by the display unit, and the terminal 11-1b may obtain the sharing information by reading the two-dimensional code thereof, for example. Further, the sharing information presentation unit 25 includes a communication unit of short-range wireless or the like, such as infrared data communication or Bluetooth ™, for example, and allows the terminal 11-1b to obtain the sharing information by transmitting the sharing information by the terminal 11-1b, for example using the communication unit thereof.

In addition, by embedding the sharing information to the information to be shared (content), displaying the embedded content to a screen of the display unit described above to allow the camera or the like included in the terminal 11-1b to image the screen, the sharing information presentation unit 25 may allow the terminal 11-1b to obtain the sharing information. Further, the sharing information presentation unit 25 includes a mail transmission unit, and by generating a mail including the sharing information and transmitting the mail to the terminal 11-1b, for example, by the mail transmitting unit, the sharing information presentation unit 25 may allow the terminal 11-1b to obtain the sharing information.

First Embodiment: Configuration Example of Function of Terminal 11-1b

The terminal 11-1b illustrated in FIG. 1 includes a sharing information acquisition unit 31, a sharing information storage unit 32, a transmission and reception unit 33, and a content browsing unit 34.

The sharing information acquisition unit 31 acquires sharing information from the terminal 11-1a, and outputs the acquired sharing information to the sharing information storage unit 32. As an example of acquisition with the sharing information acquisition unit 31, it is possible to obtain the sharing information displayed by the sharing information presentation unit 25 of the terminal 11-1a, the two-dimensional code corresponding to the sharing information, or content to which a code for sharing is embedded, for example, by capturing with a camera or the like and by reading by a code reader or the like. In addition, a mail including the sharing information is transmitted from the sharing information presentation unit 25 described above, the sharing information acquisition unit 31 may receive the mail thereof and acquire the sharing information.

The sharing information storage unit 32 is a memory unit which stores the sharing information acquired in the sharing information acquisition unit 31. Herein, when a user of the terminal 11-1b desires to acquire the information to be shared as it is from the sharing information, a content acquisition request is transmitted to the information sharing server 12-1 through the transmission and reception unit 33. In addition, the transmission and reception unit 33 receives acquisition completion notification including storage destination information (address information) of information to be shared, for example, a URL, or receives the content as it is, from the information sharing server 12-1.

The content browsing unit 34 is a display unit which displays to browse the acquired content. In addition, the content browsing unit 34 is a display unit such as a monitor, for example, but it is not limited thereto.

First Embodiment: Configuration Example of Function of Information Sharing Server 12-1

The information sharing server 12-1 illustrated in FIG. 1 includes a transmission and reception unit 41, a sharing information storage unit 42, a control unit 43, a content storage unit 44, and a URL managing unit 45.

The transmission and reception unit 41 receives an acquisition request of information to be shared (content) from the terminal 11-1b through the communication network 13. In addition, the transmission and reception unit 41 transmits the acquisition request or the like of the information to be shared (content) corresponding to a connection request or the sharing information to the terminal 11-1a, and receives content corresponding to the request from the terminal 11-1a. Further, the transmission and reception unit 41 transmits acquisition completion notification of content corresponding to the acquisition request obtained from the terminal 11-1b or the content as it is to the terminal 11-1b which sends acquisition request.

The sharing information storage unit 42 is a memory unit which stores sharing information from the terminal 11-1b obtained by the transmission and reception unit 41. In addition, the sharing information may be terminal information of the terminal 11-1a and the content ID described above, but it is not limited thereto and may include terminal information of the terminal 11-1b.

The control unit 43 controls the entire information sharing server 12-1. In detail, the control unit 43 checks the URL with respect to the URL managing unit 45 based on the terminal information and the content request (content ID) obtained from the sharing information storage unit 42, for example. Herein, when the corresponding URL exists, the content thereof is already acquired content. Accordingly, the control unit 43 generates acquisition completion notification including the URL information managed by the URL managing unit 45 and transmits the acquisition completion notification to the terminal 11-1b through the transmission and reception unit 41 without sending content acquisition request to the terminal 11-1a based on the terminal information or the content ID.

In addition, when the URL corresponding to the terminal information and the content request does not exist even if referred to the URL managing unit 45, the control unit 43 sends content request to the terminal 11-1a through the transmission and reception unit 41 and acquires the corresponding content. The acquired content is stored in a certain location of the content storage unit 44 and the address information thereof is managed in the URL managing unit 45. In addition, the control unit 43 generates acquisition completion notification including the URL information of the content managed in the URL managing unit 45 and transmits the acquisition completion notification to the terminal 11-1b through the transmission and reception unit 41.

Further, if there is an acquisition request of the content as it is from the terminal 11-1b, the control unit 43 acquires the corresponding content from the content storage unit 44 and transmits to the terminal 11-1b through the transmission and reception unit 41.

The content storage unit 44 stores the content obtained from the terminal 11-1a. In addition, the content storage unit 44 outputs address information (URL or file name) of the content corresponding to stored content to the URL managing unit 45. Further, the content storage unit 44 extracts content corresponding to the content request from the control unit 43 and outputs the extracted content to the control unit 43.

The URL managing unit 45 is a storage destination managing unit which manages the storage destination information (address information) which indicates where the content is stored, in the content storage unit 44. In detail, the URL managing unit 45 manages the URL information as the address information. That is, the URL managing unit 45 manages data including the "terminal information (for example, "a001")", the "content ID (for example, "image001")", the "address information of storage destination (for example, http://file-server-abc/11-1a/001)", or the like.

In addition, in the first embodiment, the transmission and reception units 21, 33, and 41 in the terminals 11-1a and 11-b and the information sharing server 12-1 may be configured to separately have a transmission unit and a reception unit, respectively.

Terminals 11-1 (Configuration Example of Hardware)

Figure 2:
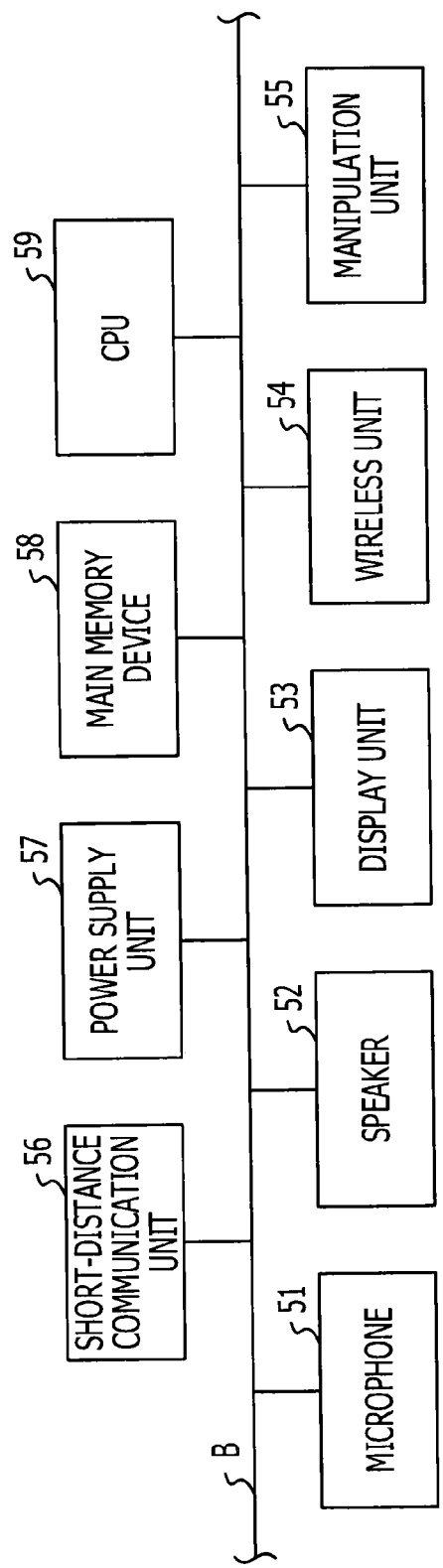
FIG. 2 is a diagram illustrating an example of a hardware configuration of a terminal.

Next, a configuration example of hardware of the terminals 11-1 described above will be described with reference to FIG. 2. FIG. 2 is a diagram illustrating an example of a hardware configuration of the terminal. The terminals 11-1 illustrated in FIG. 2 include a microphone 51, a speaker 52, a display unit 53, a wireless unit 54, a manipulation unit 55, a short-distance communication unit 56, a power supply unit 57, a main memory device 58, and a Central Processing Unit (CPU) 59.

The microphone 51 inputs audio generated by a user or other sounds. The speaker 52 outputs audio of a person who answers the phone, or outputs ringtone sounds.

The display unit 53 displays time information, information related to that whether or not the terminal is out of the communication range, text data, image data, moving image data, or the like. In addition, as the display unit 53, for example, a liquid crystal display (LCD) or the like is used, but it is not limited thereto.

The wireless unit 54 is a transmission and reception unit of communication data which receives a wireless signal (communication data) from a base station or the like using an antenna, or transmits a wireless signal to the base station through the antenna.

The manipulation unit 55 is pressed by a user, at the time of setting of various functions, at the time of adding phone numbers, and at the time of calling and answering an incoming call. In addition, in a case of the terminal 11-1a, the manipulation unit 55 is pressed by a user, when generating sharing information by setting information to be shared from a plurality of stored content items or presenting the generated sharing information. Further, in a case of the terminal 11-1b, the manipulation unit 55 is pressed by a user, when acquiring the sharing information from the terminal 11-1a, sending content request to the information sharing server 12-1, or browsing content. That is, the manipulation unit 55 is an input unit which inputs various indication information items from a user.

The short-distance communication unit 56 performs short distance communication with another terminal or a relaying apparatus. In addition, the short-distance communication unit 56 performs direct communication between terminals by wireless communication using infrared rays or Bluetooth, for example.

The power supply unit 57 supplies power to each configuration of the terminals 11-1. In addition, the power supply unit 57 is an internal power source such as a battery, for example, but it is not limited thereto.

The main memory device 58 is a memory unit which stores various information items of the terminals 11-1 and may perform writing and reading of the information. In addition, the main memory device 58 is a read only memory (ROM), a random access memory (RAM), or the like, for example, but it is not limited thereto. Herein, a program and the like for executing an information sharing process on the terminal side of the embodiment are recorded in the ROM. In addition, the content, the sharing information, the terminal information, the user data, and the like are recorded in the RAM.

The CPU 59 controls a process of the terminal 11-1 such as various operations, and input and output of data to and from each hardware configuration unit, based on a control program such as an operating system (OS) and an execution program stored in the main memory device 58. In addition, the CPU 59 performs a process based on the program stored in the main memory device 58 in advance. In detail, the CPU 59 performs control of transmission and reception of the wireless signal of the wireless unit 54, display control of the display unit 53, a detection process of manipulation content of the manipulation unit 55, control of short-distance wireless communication of the short-distance communication unit 56, writing and reading of the information to and from the main memory device 58, and the like.

By the hardware configurations described above, it is possible to execute various processes of the terminals 11-1 of the first embodiment. In addition, by installing the execution program, it is possible to easily realize various processes of the terminals 11-1 using a computer or the like.

Information Sharing Server 12-1: Example of Hardware Configuration

Figure 3:
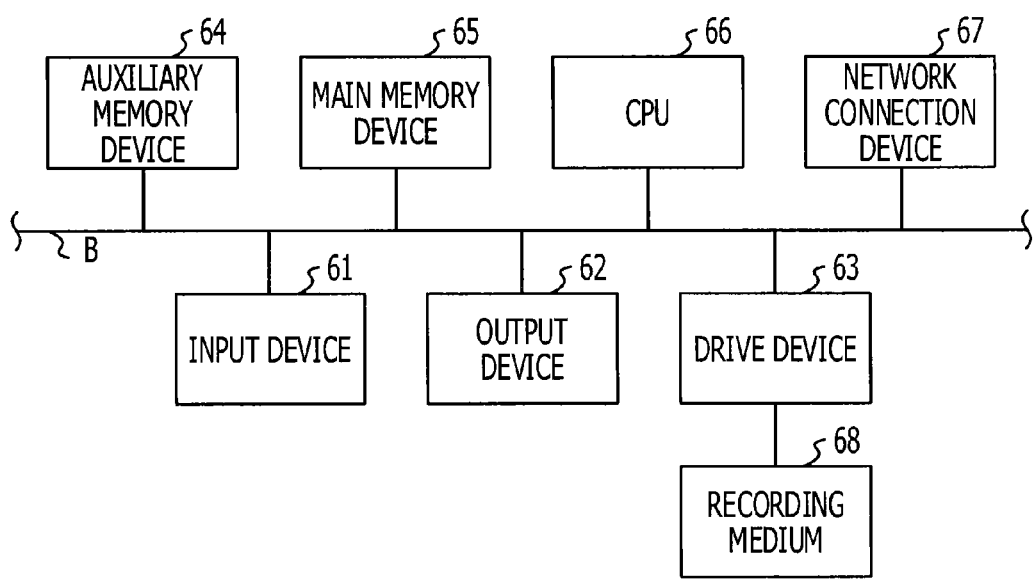
FIG. 3 is a diagram illustrating an example of a hardware configuration of an information sharing server.

FIG. 3 is a diagram illustrating an example of a hardware configuration of the information sharing server 12-1. The example of the hardware configuration illustrated in FIG. 3 includes an input device 61, an output device 62, a drive device 63, an auxiliary memory device 64, a main memory device 65, a CPU 66, and a network connection device 67; these are mutually connected by a system bus B.

The input device 61 includes pointing devices such as a keyboard, a mouse, and the like manipulated by a user of the information sharing server 12-1, for example, and inputs various manipulation signals such as execution of a program from a user, or the like, for example.

The output device 62 includes a monitor (display) which displays various windows or data desired for manipulating the main computer which performs the process of the embodiment, and displays an execution progress or a result of the control program executed by the CPU 66.

Herein, the execution program (information sharing program) installed in the main computer of the information sharing server 12-1 is provided by a recording medium 68 or the like, for example. The drive device 63 reads various data items such as the execution program recorded in the recording medium 68. That is, the recording medium 68 may be set in the drive device 63, and the execution program included in the recording medium 68 is installed in the auxiliary memory device 64 from the recording medium 68 through the drive device 63. In addition, when writing is possible in the set recording medium 68, it is possible to write data such as an execution result obtained by executing the program, for example, in the drive device 63.

The auxiliary memory device 64 is a storage unit such as a hard disk drive or a solid state drive (SSD), and stores the execution program or the control program of the embodiment, and performs input and output if desired.

The main memory device 65 stores the execution program or the like read from the auxiliary memory device 64 by the CPU 66. In addition, the main memory device 65 includes a read only memory (ROM) or a random access memory (RAM).

The CPU 66 controls a process of the entire computer such as various operations, and input and output of data to and from each hardware configuration unit, based on a control program such as an OS and an execution program stored in the main memory device 65, and thus each process for sharing information is realized. In addition, various information items desired for executing the program is acquired from the auxiliary memory device 64, and an execution result or the like is stored.

The network connection device 67 is a communication interface which enables transmission and reception of data to and from an external device through the communication network 13. In addition, the network connection device 67 may acquire the execution program from the connected external device or the like or may provide the execution result obtained by executing the program or the execution program as it is which corresponds to the embodiment, to the external device or the like.

The recording medium 68 is a recording medium which may be read by the computer which stores the execution program or the like described above. The recording medium 68 may be a portable recording medium such as Universal Serial Bus (USB) memory, a CD-ROM or DVD disc, or may be a semiconductor memory such as a flash memory, for example.

In addition, the information sharing server 12-1 has been described as one device, but in the embodiment, it is not limited thereto, and it is possible to be applied as the cloud service described above.

Information Sharing Process Example of First Embodiment

Figure 4:
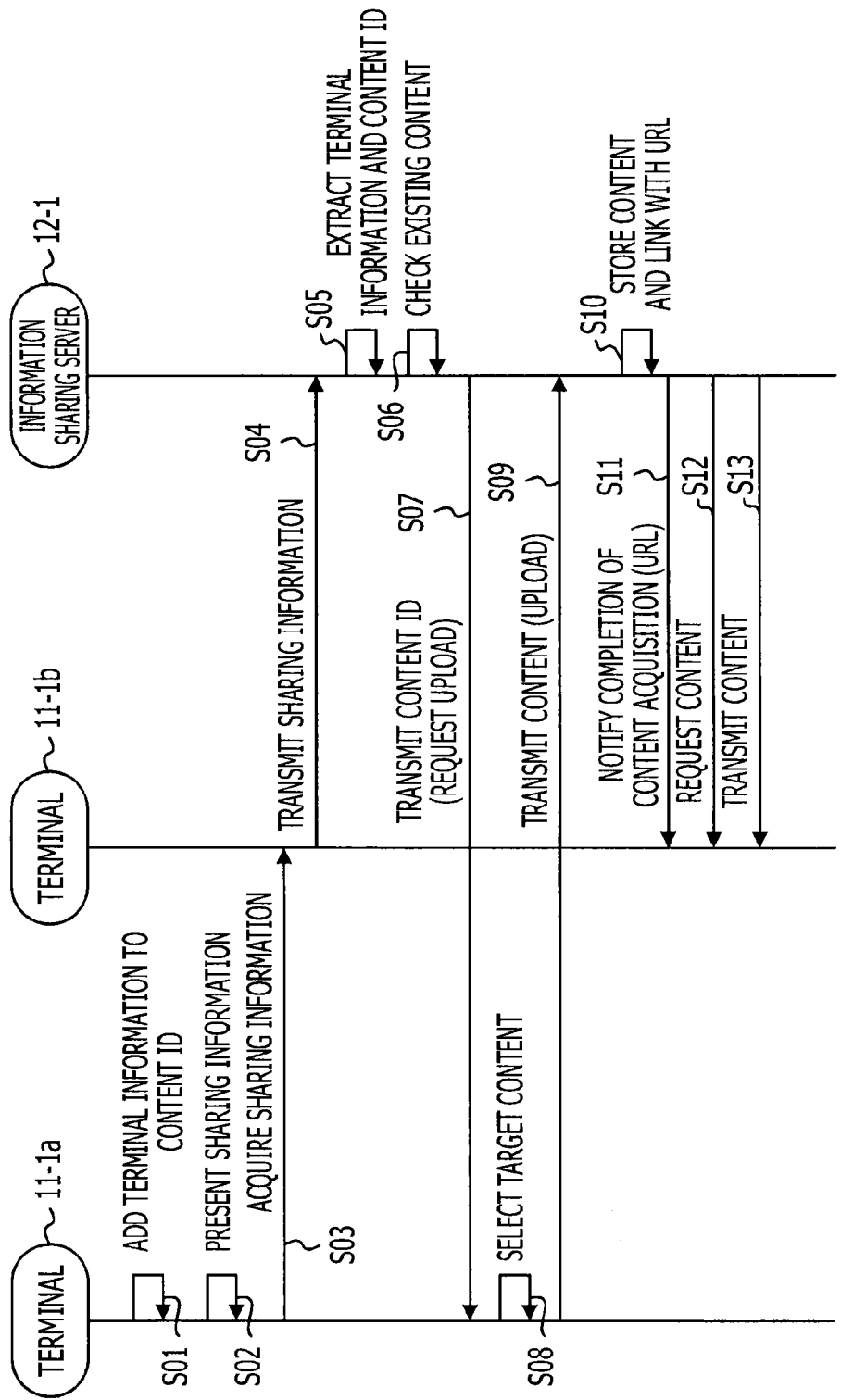
FIG. 4 is a sequence diagram illustrating an example of an information sharing process of the first embodiment.

Next, an example of an information sharing process of the first embodiment will be described with reference to FIG. 4. FIG. 4 is a sequence diagram illustrating the example of the information sharing process of the first embodiment. In addition, as an example, FIG. 4 includes the terminal 11-1a (first terminal), the terminal 11-1b (second terminal), and the information sharing server 12-1 described above. Further, the terminal 11-1a is a terminal which is used by the content owner, and the terminal 11-1b is a terminal which is used by a content sharer.

In the information sharing process of the first embodiment, the terminal 11-1a adds the terminal information to the content ID corresponding to the information to be shared (for example, content such as an image, a moving image, or a data file) (S01), and presents the generated sharing information (S02).

The terminal 11-1b acquires the presented sharing information (S03). In addition, in the process of S03, the sharing information is acquired according to the presentation content of the sharing information by the terminal 11-1a described above. For example, when the sharing information is displayed as it is on the screen, the user of the terminal 11-1b may directly input the information thereof, and when the QR code or the like corresponding to the sharing information is presented, the sharing information is acquired by reading the code thereof with a reader. In addition, when the sharing information is embedded in the image, the sharing information may be acquired by capturing the image in which the sharing information is embedded. Further, the terminal 11-1b may acquire the sharing information from the terminal 11-1a by the short-distance wireless communication such as infrared rays, and may receive an electronic mail from the terminal 11-1a and acquire the sharing information included in the received mail.

Herein, when the user of the terminal 11-1b desires to acquire the information corresponding to the sharing information, the sharing information is transmitted to the information sharing server 12-1 (S04).

The information sharing server 12-1 extracts the terminal information and the content ID included in the sharing information received from the terminal 11-1b (S05), and checks whether or not the corresponding content is previously acquired, based on the extracted terminal information and the content ID (S06). When the content corresponding to the content ID is not acquired, the information sharing server 12-1 transmits the content ID to the terminal 11-1a based on the terminal information to send the acquisition request (upload request) of the content (S07).

The terminal 11-1a selects the target content based on the content ID obtained from the information sharing server 12-1 (S08), and transmits (uploads) the selected content to the information sharing server 12-1 (S09).

The information sharing server 12-1 stores the content obtained from the terminal 11-1a and links the content ID and the URL of the storage destination (address information) (S10), and transmits the acquisition completion notification of the content including the linked URL to the terminal 11-1b (S11).

The terminal 11-1b sends the request of the content to the information sharing server 12-1 at the desired timing of a user, based on the URL added to the acquisition completion notification of the content obtained from the information sharing server 12-1 (S12). The information sharing server 12-1 transmits the content corresponding to the request of the content obtained from the terminal 11-1b (S13).

In addition, in the information sharing process described above, when there is already-existing content in the process of S06, the acquisition completion notification of the content to which the URL corresponding to the already-existing content is added may be transmitted in the process of S11, without performing the processes from S07 to S10. Accordingly, since it is not desired to acquire the content information previously acquired from the terminal 11-1a again, it is possible to reduce the process and rapidly realize the information sharing process.

As described above, in the first embodiment, the terminal 11-1b may acquire the content retained in the terminal 11-1a at the time decided by a user. In addition, since it is only desired for the user of the terminal 11-1a (content owner) to upload the target content when there is a request of the content from the information sharing server 12-1, it is possible to simply perform the information sharing.

Next, each content of the detailed information sharing process of the terminal 11-1a (first terminal), the terminal 11-1b (second terminal), and the information sharing server 12-1 will be described with reference to FIGS. 5 to 7.

Figure 5:
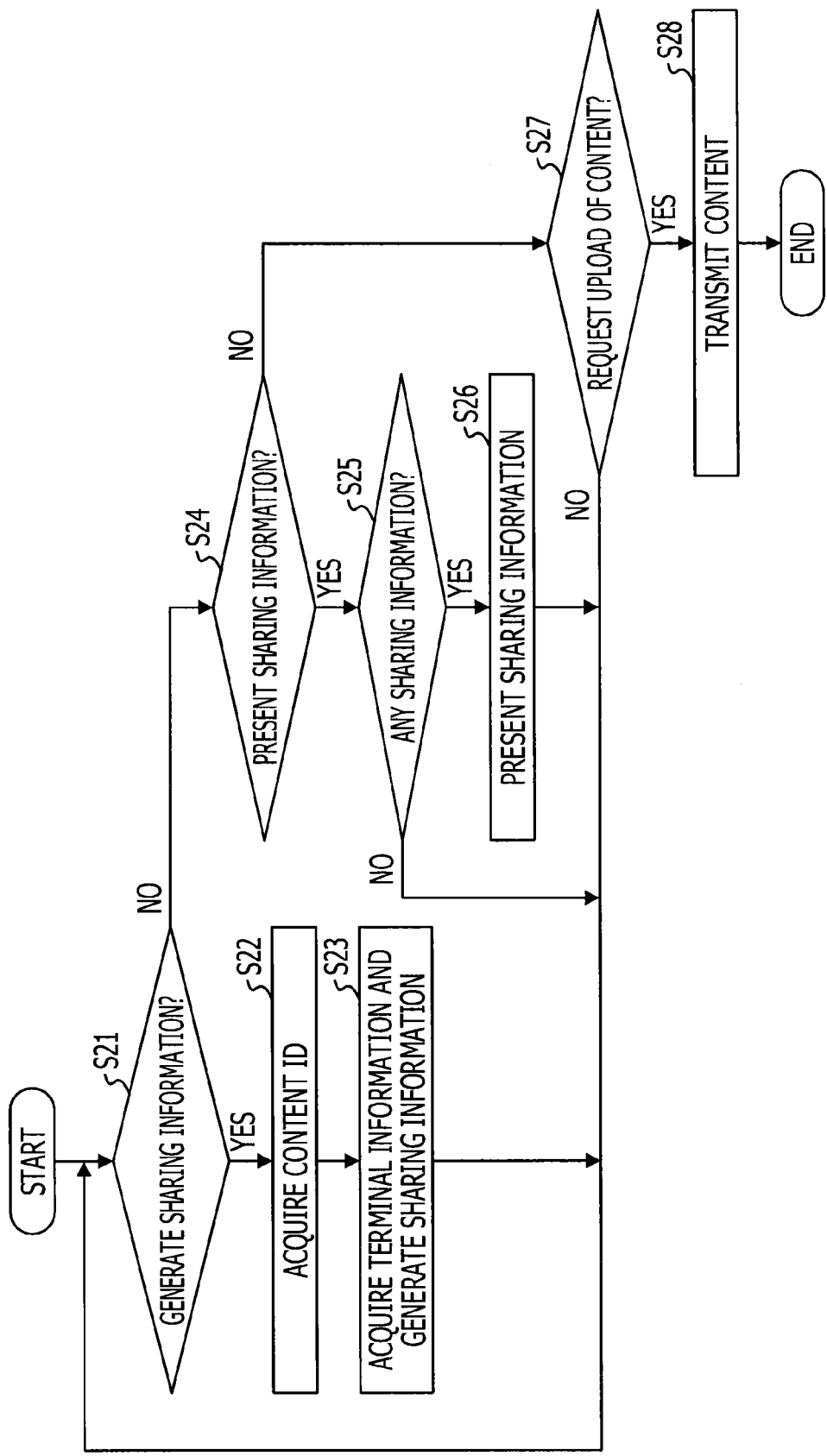
FIG. 5 is a flowchart illustrating an example of an information sharing process of a first terminal of the first embodiment.

Information Sharing Process Example of First Terminal (Terminal 11-1a) of First Embodiment FIG. 5 is a flowchart illustrating an example of the information sharing process of the first terminal of the first embodiment. In addition, in the example of FIG. 5, a case of sharing at least one content item from the content stored in advance is illustrated.

First, the information sharing process of the first terminal illustrated in FIG. 5 determines whether or not to generate the sharing information corresponding to the information to be shared (content) (S21), and when generating the sharing information (YES in S21), the content ID which identifies the information to be shared is acquired (S22). In addition, the information sharing process acquires the terminal information of the first terminal to generate the sharing information including the content ID and the terminal information (S23), and the process returns to the process of S21.

In the process of S21, in a case of not generating the sharing information (NO in S21), the information sharing process determines whether or not to present the generated sharing information (S24). In addition, the case of not generating the sharing information includes a state where the sharing information is generated in advance, for example.

When presenting the sharing information (YES in S24), the information sharing process determines whether or not there is sharing information to be presented (S25), and when there is the sharing information (YES in S25), the sharing information is presented (S26). In addition, in the process of S24, in a case of not presenting the sharing information (NO in S24), the information sharing process determines whether or not there is an upload request of the content from the information sharing server 12-1 (S27). Further, the case of not presenting the sharing information described above includes a state after the presentation of the sharing information in advance, for example.

When there is an upload request of the content (YES in S27), the information sharing process transmits the requested content to the information sharing server 12-1 (S28). In addition, when there is no upload request of the content (NO in S27), the information sharing process returns to the process of S21. Further, in the process of S25, when there is no sharing information (NO in S25), or after the process of S26, the information sharing process returns to the process of S21.

Information Sharing Process Example of Second Terminal (Terminal 11-1b) of First Embodiment Next, an information sharing process of the second terminal (terminal 11-1b) of the first embodiment will be described with reference to FIG. 6. FIG. 6 is a flowchart illustrating an example of the information sharing process of the second terminal of the first embodiment.

Figure 6:
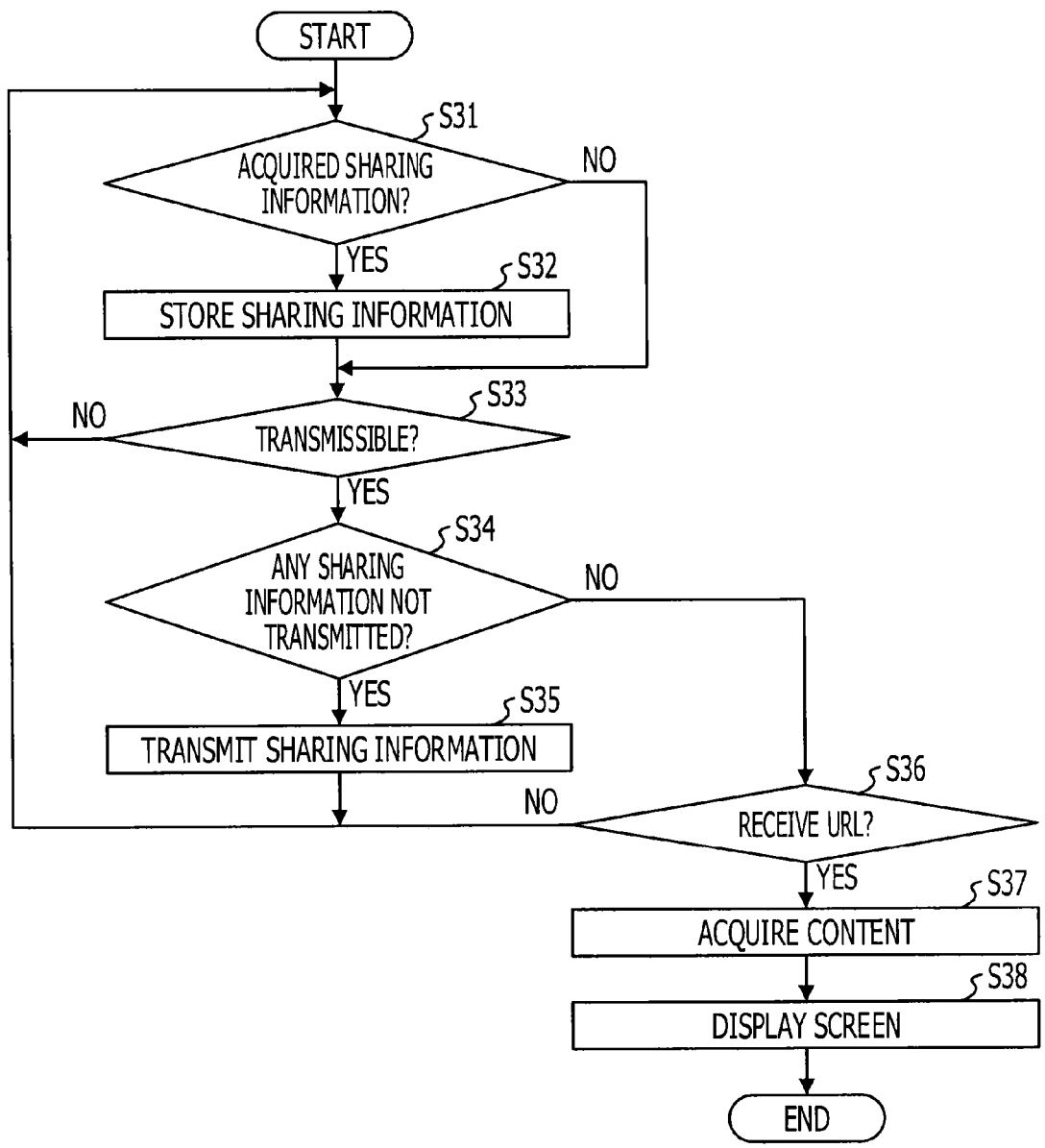
FIG. 6 is a flowchart illustrating an example of an information sharing process of a second terminal of the first embodiment.

The information sharing process of the second terminal illustrated in FIG. 6 determines whether or not the sharing information is acquired from the terminal 11-1a (first terminal), for example (S31), and when the sharing information is acquired (YES in S31), the sharing information is stored (S32). Next, after the process of S32 or in the process of S31, when the sharing information is not acquired (NO in S31), the information sharing process determines whether or not the second terminal may communicate with the information sharing server 12-1 (S33). In addition, the case in which the sharing information described above is not acquired includes a state where the sharing information is acquired in advance, for example.

When the second terminal may not communicate with the information sharing server 12-1 (NO in S33), the information sharing process returns to the process of S31. That is, the second terminal waits until the second terminal becomes to be communicated with the information sharing server 12-1. In addition, when the second terminal may communicate with the information sharing server 12-1 (YES in S33), the information sharing process determines whether or not there is sharing information not transmitted (S34). When there is sharing information not yet transmitted (YES in S34), the information sharing process transmits the sharing information thereof (S35), and the process returns to the process of S31. Further, when there is no sharing information not yet transmitted (NO in S34), the information sharing process determines whether or not the URL is received from the information sharing server 12-1 (S36). Herein, as described above, the URL is the acquisition completion notification of the content including the address information of the storage destination of the content corresponding to the sharing information transmitted to the information sharing server 12-1, but it is not limited thereto.

In the process of S36, when the URL is received (YES in S36), the information sharing process acquires the content corresponding to the URL thereof (S37), and displays the acquired content on the screen (S38). In addition, in the process of S37, it is possible to acquire (for example, download) the content by accessing the content stored in the information sharing server 12-1 based on the URL, for example, but it is not limited thereto. Further, in the process of S36 described above, in a case of not receiving the URL (NO in S36), the information sharing process returns to the process of S31 and waits until the URL is received. By the process described above, it is possible for a user to browse the sharing information of another terminal on the screen.

Figure 7:
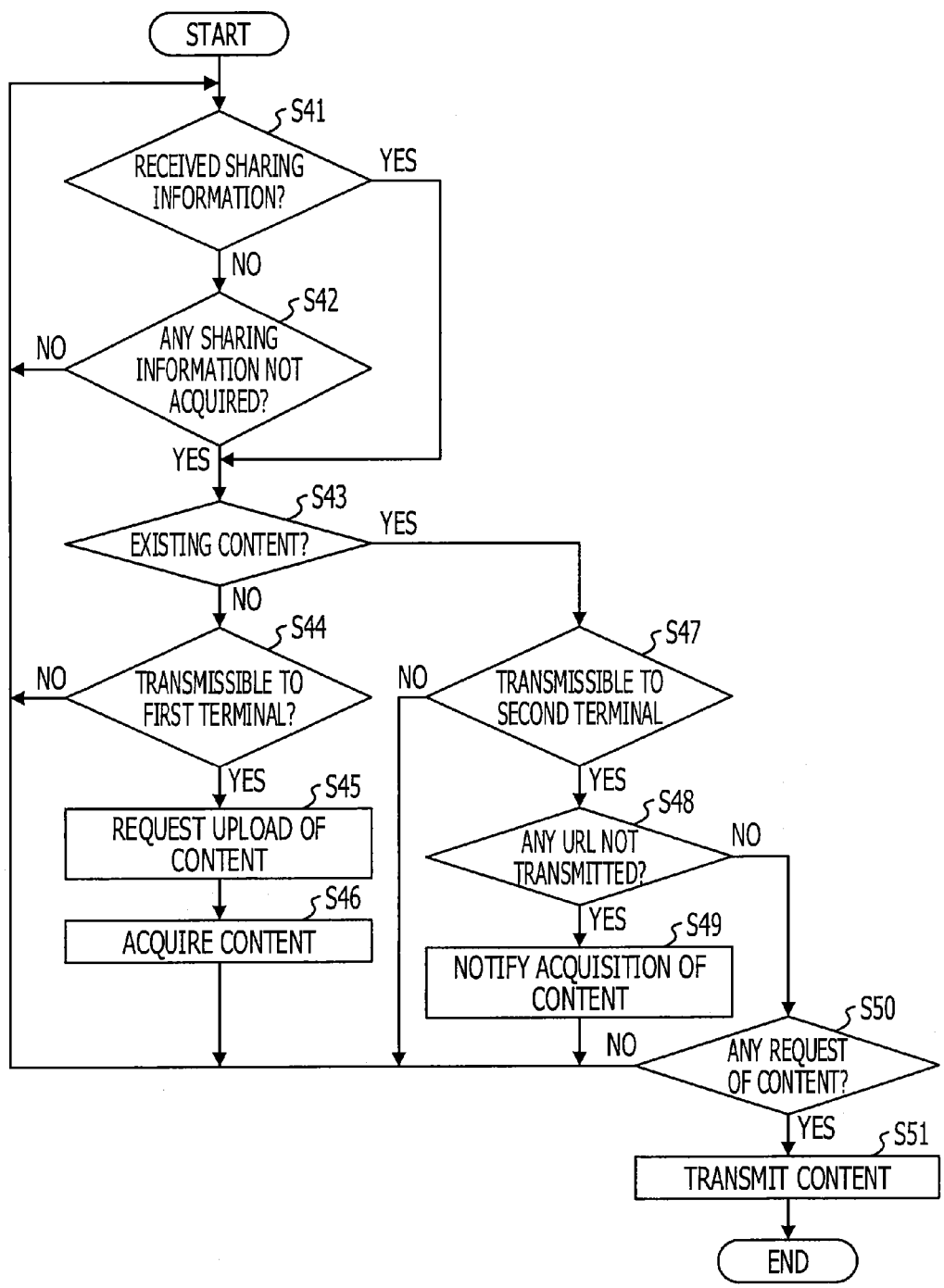
FIG. 7 is a flowchart illustrating an example of an information sharing process of an information sharing server of the first embodiment.

Information Sharing Process Example of Information Sharing Server 12-1 of First Embodiment FIG. 7 is a flowchart illustrating an example of an information sharing process of the information sharing server of the first embodiment. First, the information sharing process of the information sharing server 12-1 illustrated in FIG. 7 determines whether or not the sharing information is received (S41), and when the sharing information is not received (NO in S41), the information sharing process determines whether or not there is sharing information not acquired (S42). In addition, the sharing information not acquired includes sharing information in which the content (information to be shared) corresponding to the first terminal is not yet acquired, for example. When there is no sharing information not acquired (NO in S42), the information sharing process returns to the process of S41.

In addition, in the process of S41, when the sharing information is received (YES in S41), or when there is sharing information not acquired (YES in S42), the information sharing process determines whether or not there is content (already-existing content) which is already acquired in the content corresponding to the sharing information (S43). Further, by the determination of S43, it is possible to perform determination with respect to the content information stored in the content storage unit 44 described above, depending on whether or not the content corresponding to the content ID exists, by referring to the content ID included in the sharing information.

When there is no already-existing content (NO in S43), the information sharing process determines whether or not the information sharing server 12-1 may communicate with the first terminal (terminal 11-1a) (S44). Herein, determining whether or not the information sharing server 12-1 may communicate with the first terminal is performed because the information which indicates that the owner of the information to be shared (content) is the owner of the first terminal, is included in the terminal information included in the sharing information. That is, the information sharing server 12-1 sends an upload request of content to the terminal corresponding to the terminal information.

Accordingly, when the information sharing server 12-1 may communicate with the first terminal (YES in S44), the information sharing process sends an upload request of the content to the first terminal (S45). In addition, determining whether or not the information sharing server 12-1 may communicate with the first terminal in S44 includes determination whether or not the first terminal is out of the range of communication and may not communicate therewith, or the like. In the process of S44, when the information sharing server 12-1 may not communicate with the first terminal (NO in S44), the information sharing process returns to the process of S41. That is, the information sharing server 12-1 waits until it is communicated with the first terminal. In addition, the upload request of the content of the process of S45 sends the upload request of the corresponding content, based on the content ID or the like included in the sharing information, for example. Further, the information sharing process acquires the content from the first terminal (S46), and the process returns to the process of S41.

In addition, in the process of S43, when there is already-existing content (YES in S43), the information sharing process determines whether or not the information sharing server 12-1 may communicate with the second terminal (terminal 1'-1b) (S47). Herein, determining whether or not the information sharing server 12-1 may communicate with the second terminal is performed because the second terminal has been transmitted the sharing information, and to transmit the acquisition notification of the content or the content to the second terminal. In addition, determining whether or not the information sharing server 12-1 may communicate with the second terminal in S47 includes determination of whether or not the second terminal is out of communication range and may not communicate therewith, or the like.

In the process of S47, when the information sharing server 12-1 may communicate with the second terminal (YES in S47), the information sharing process determines whether or not there is a URL not transmitted to the second terminal (S48). Herein, as described above, the URL indicates address information or the like which stores the content acquired in S46, but it is not limited thereto.

In addition, when there is the URL not transmitted (YES in S48), the information sharing process sends the acquisition notification of the content including the URL to the second terminal (S49), and the process returns to the process of S41. In addition, when there is no URL not transmitted (NO in S48), the information sharing process determines whether or not there is a request of the content based on the URL from the second terminal (S50), and when there is the request of the content (YES in S50), the content is transmitted to the second terminal (S51).

In addition, when there is no request of the content (NO in S50), the information sharing process returns to the process of S41. Further, in the process of S47, when the information sharing server may communicate with the second terminal (NO in S47), the information sharing process returns to the process of S41.

Content of Information Sharing According to First Embodiment

Figure 8:
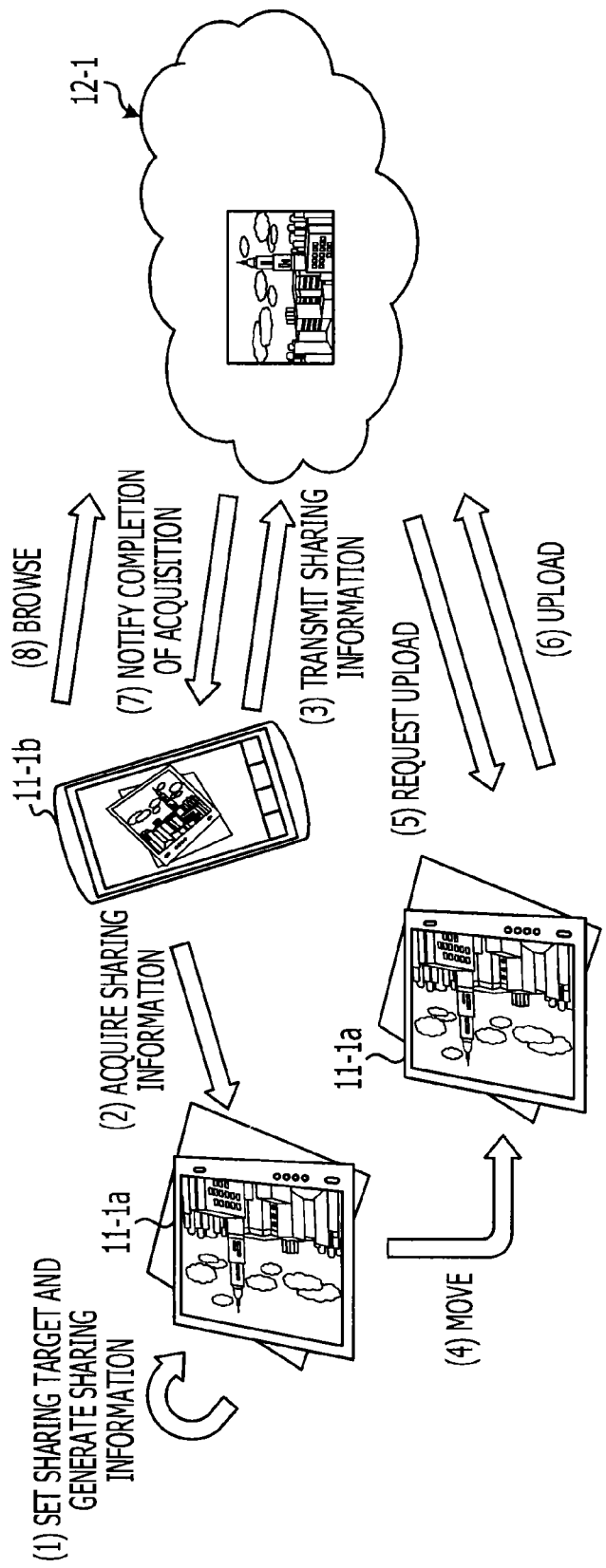
FIG. 8 is a diagram for describing content of information sharing according to the first embodiment.

Herein, the content of the information sharing according to the first embodiment will be described with reference to FIG. 8. FIG. 8 is a diagram for describing the content of the information sharing according to the first embodiment. In an example of FIG. 8, the content of the information sharing using the first terminal (terminal 11-1a), the second terminal (terminal 11-1b), and the information sharing server 12-1 has been described, however it is not limited thereto, and the plurality of first terminals or the second terminals may be provided, for example. In addition, in the example of FIG. 8, the function of the information sharing server 12-1 described above is set to be provided as a cloud service, for example.

In the information sharing according to the first embodiment, the sharing of the information is realized with a procedure of (1) to (8) of FIG. 8, for example. In detail, in the first embodiment, the sharing information corresponding to the content is generated on the terminal 11-1a of the content owner, for example ((1) of FIG. 8). Next, in the first embodiment, the terminal 11-1b of the sharer acquires the sharing information from the terminal 11-1a ((2) of FIG. 8). Herein, when the sharer desires to acquire (browse) the information (content) corresponding to the acquired sharing information, the sharing information is transmitted to the information sharing server 12-1 from the terminal 11-1b ((3) of FIG. 8).

Herein, in (1) of FIG. 8, the terminal 11-1a may not communicate with the information sharing server 12-1, however, the terminal 11-1a is set to be communicated with the information sharing server 12-1 due to the movement ((4) of FIG. 8). At that time, the information sharing server 12-1 sends the upload request of the content to the terminal 11-1a ((5) of FIG. 8). The terminal 11-1a uploads the target content according to the upload request from the information sharing server 12-1 ((6) of FIG. 8).

The information sharing server 12-1 stores the uploaded content in a certain location, performs the linking with the address information (URL) of the storage destination, and transmits the acquisition completion notification including the URL thereof to the terminal 11-1b ((7) of FIG. 8). The sharer may receive the acquisition completion notification of the content, acquire the content based on the URL or the like included in the acquisition completion notification of the content, and browse the content by displaying the content on the screen of the terminal 11-1b ((8) of FIG. 8).

Setting Example of Sharing Information

Figure 9:
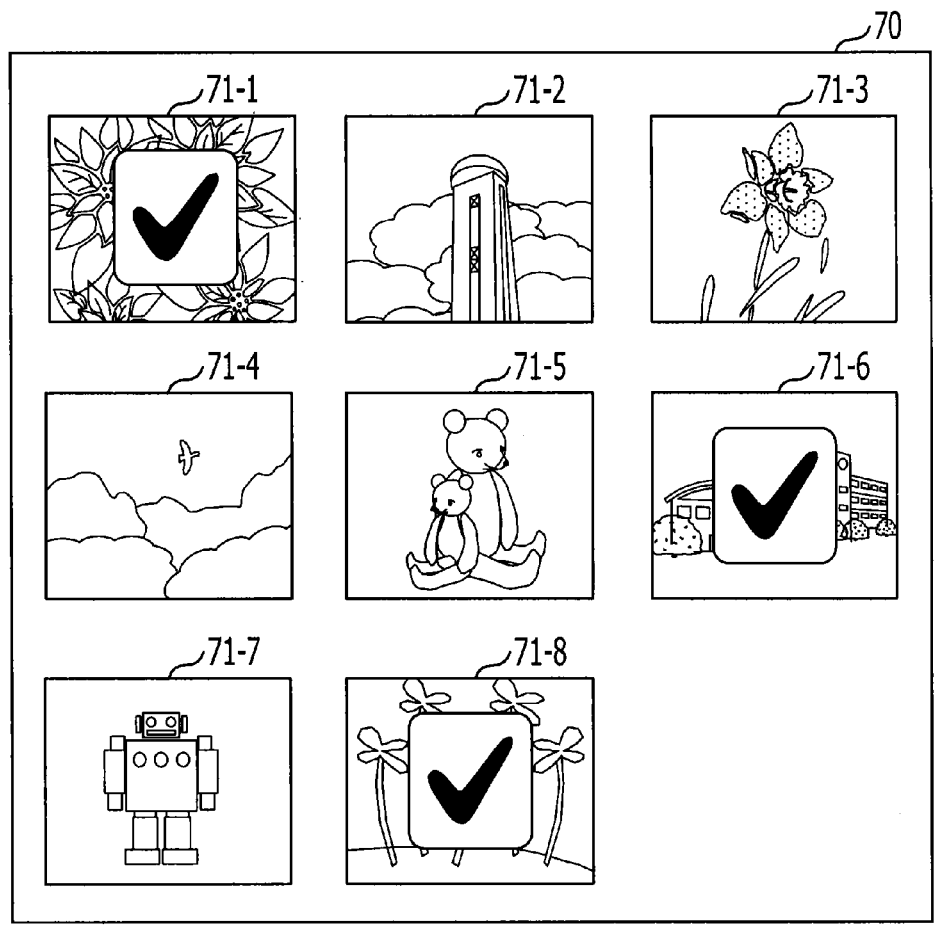
FIG. 9 is a diagram for describing a setting example of sharing information.

Next, a setting example of the sharing information will be described with reference to FIG. 9. FIG. 9 is a diagram illustrating the setting example of the sharing information. In the first embodiment, the content sharer may select the information to be shared from the plurality of content items. In detail, all images 71-1 to 71-8 which are examples of the plurality of content items are displayed on a display screen 70 of the terminal 11-1a. Accordingly, the content sharer may easily set an image of the information to be shared from the displayed images 71-1 to 71-8. In addition, the images 71-1 to 71-8 may be preview images (thumbnail images) which are obtained by reducing the original images or reducing the data capacity by degrading the image quality, for example, however they are not limited thereto.

In an example of FIG. 9, for example, the images 71-1, 71-6, and 71-8 are selected as the information to be shared, and the sharing information is generated based on the selected images (content items). That is, one or a plurality of content items may be included in the sharing information. In addition, for another example, by storing the information to be shared in one folder or the like, it is possible to generate the sharing information by a folder unit. In this case, the identification information which is added to the sharing information may be a folder ID which identifies the folder, other than the content ID which identifies the content.

In the first embodiment described above, it is possible to realize the information sharing even in an environment where the sharing operation between the terminals is difficult, for example. In detail, at the time of sharing, for example, by designating the content to be uploaded by the sharer side, it is possible to open only the content which the sharer desires to see, without causing stress to the content owner. Accordingly, it is possible to easily share information.

Figure 10:
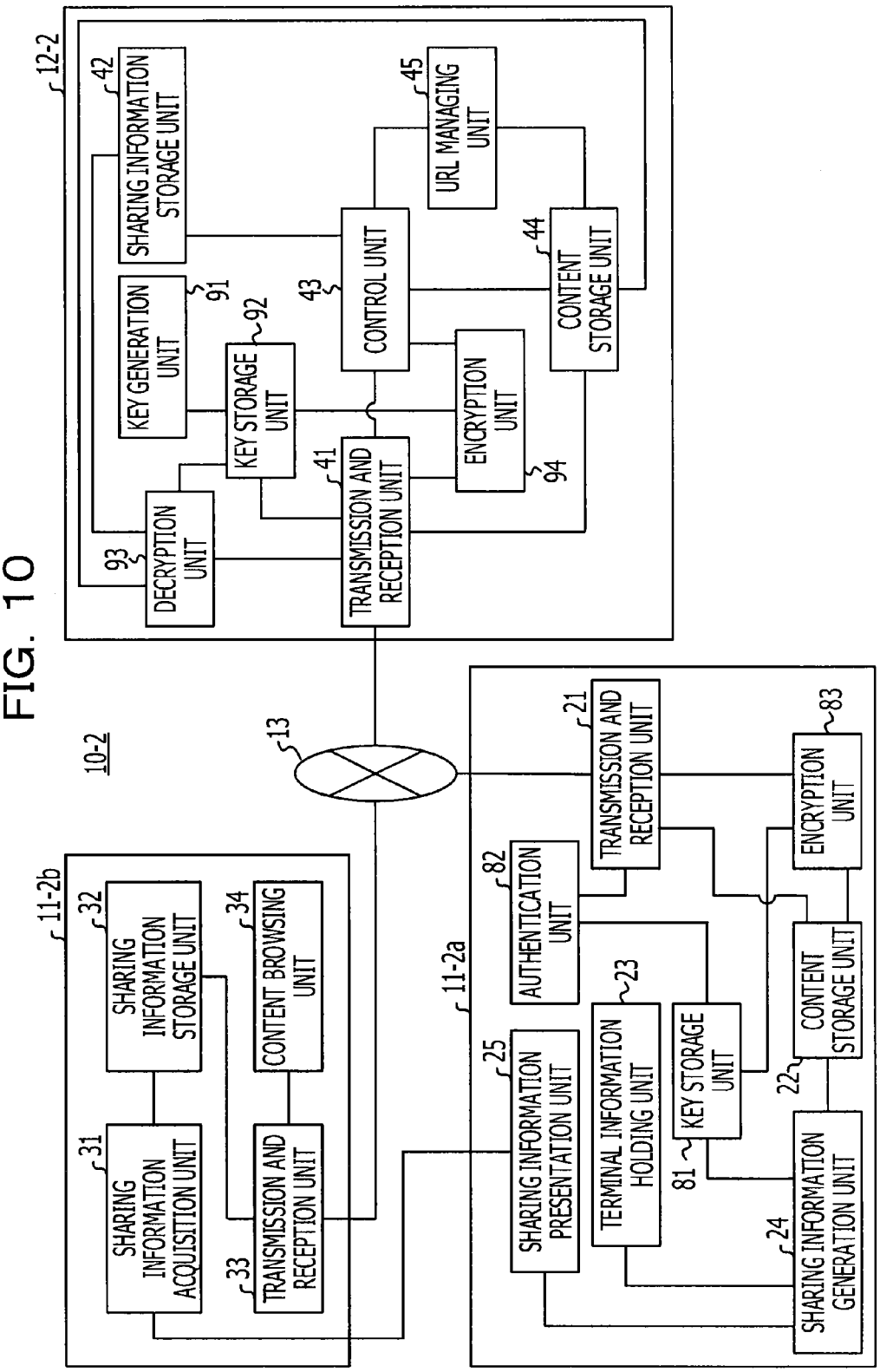
FIG. 10 is a diagram illustrating an example of a schematic configuration of an information sharing system of a second embodiment.

Second Embodiment: Schematic Configuration Example of Information Sharing System Next, an information sharing system of the second embodiment will be described with reference to FIG. 10. FIG. 10 is a diagram illustrating an example of a schematic configuration of the information sharing system of the second embodiment. In addition, in an information sharing system 10-2 illustrated in FIG. 10, the configuration parts which are the same as the information sharing system 10-1 of the first embodiment described above have the same reference numerals, and the detailed description thereof will be omitted, herein. Further, since the hardware configurations which are the same as the first embodiment described above may be applied to hardware configurations of a first terminal (terminal 11-2a), a second terminal (terminal 11-2b), and an information sharing server 12-2, the detailed description thereof will be omitted herein.

The information sharing system 10-2 illustrated in FIG. 10 includes the plurality of terminals 11-2a and 11-2b (hereinafter, referred to collectively as "terminals 11-2" if desired), and the information sharing server 12-2. In addition, the terminals 11-2 and the information sharing server 12-2 are connected in a state of being able to transmit and receive data through the communication network 13 or the like as described above.

When compared to the first embodiment, in the second embodiment, authentication with encryption and decryption, or the like is performed when receiving and transmitting the information between the terminal 11-2a of the content owner and the information sharing server 12-2. Accordingly, in the second embodiment, it is possible to avoid leakage of information or avoid illegal access. Next, the terminals 11-2a and 11-2b and the information sharing server 12-2 of the second embodiment will be described in detail.

Second Embodiment: Configuration Example of Function of Terminal 11-2a

The terminal 11-2a illustrated in FIG. 10 includes the transmission and reception unit 21, the content storage unit 22, the terminal information holding unit 23, the sharing information generation unit 24, and the sharing information presentation unit 25, a key storage unit 81, an authentication 82, and an encryption unit 83.

The key storage unit 81 is a memory unit which stores key information generated in the information sharing server 12-2, for example. Herein, the key information includes key information for concealing the terminal information, the content ID, or the content or key information for authenticating the access from another device. In addition, the key information described above may be a public key or a secret key. Further, the key information described above is acquired from the information sharing server 12-2 through the transmission and reception unit 21 in advance, and is stored in the key storage unit 81, for example. The key information is preferably regularly changed for security improvement.

Since the authentication unit 82 avoids access of another device impersonating the information sharing server 12-2 with respect to the connection request or the content request (content ID) from the information sharing server 12-2, an authentication process is performed using the key information for authentication obtained from the key storage unit 81. In detail, in a case where it is authenticated as OK, the authentication unit 82 allows the connection, and in a case where it is authenticated as NG, the authentication unit 82 transmits a message indicating the case to an accessing device, and disallows the connection. In addition, allowing the connection includes establishing a private communication line to perform the communication, for example. In the second embodiment, by performing communication with the private communication line, for example, it is possible to avoid the leakage of the information, for example, and to improve the security.

The encryption unit 83 performs encryption with respect to the content obtained from the content storage unit 22, with the key information for concealing obtained from the key storage unit 81. In addition, the encryption unit 83 transmits the encrypted content to the information sharing server 12-2 through the transmission and reception unit 21.

In addition, when generating the sharing information corresponding to the information (content) to be shared selected from the content stored in the content storage unit 22, the sharing information generation unit 24 of the second embodiment performs encryption of the sharing information with the key information for concealing obtained from the key storage unit 81. Further, in a case of performing the encryption, the information may include only the terminal information included in the sharing information, may only include the content ID, or may include both. The sharing information generated in the sharing information generation unit 24 is presented by the sharing information presentation unit 25 with the same method as the first embodiment, and is obtained by the sharing information acquisition unit 31 of the second terminal (terminal 11-2b).

Herein, the terminal 11-2b acquires the sharing information with the same process as the terminal 11-1b described above, for example, and when a user desires to browse the information (content) corresponding to the sharing information, the sharing information is transmitted to the information sharing server 12-2. In addition, since the sharing information is already encrypted, the sharing information transmitted from the terminal 11-2b maintains confidentialness. Accordingly, since the function configuration of the terminal 11-2b of the second embodiment may use the function configuration of the terminal 11-1b of the first embodiment described above, the description thereof will be omitted.

Second Embodiment: Configuration Example of Function of Information Sharing Server 12-2

The information sharing server 12-2 illustrated in FIG. 10 includes the transmission and reception unit 41, the sharing information storage unit 42, the control unit 43, the content storage unit 44, the URL managing unit 45, a key generation unit 91, a key storage unit 92, a decryption unit 93, and an encryption unit 94.

The key generation unit 91 generates key information (for example, a secret key "key 1", a public key "key 1'") for concealing the sharing information or the content used in the second embodiment, key information (for example, a secret key "key 2", a public key "key 2'") for authenticating an access from an external device, and the like. The key generation unit 91 outputs the generated key information (for example, "key 1", "key 1'", "key 2", and "key 2'") to the key storage unit 92.

The key storage unit 92 is a storage unit which stores the key information (for example, "key 1", "key 1'", "key 2", and "key 2'") generated by the key generation unit 91.

The decryption unit 93 performs decryption with respect to the sharing information or the content obtained from the transmission and reception unit 41 using the key information (for example, "key 1"). The decryption unit 93 stores the decrypted sharing information (terminal information and content ID) in the sharing information storage unit 42. In addition, the decryption unit 93 stores the decrypted content in the content storage unit 44.

The encryption unit 94 acquires the terminal information and the content request obtained from the control unit 43 and performs encryption using the key information (for example, "key 2") obtained from the key storage unit 92. The encryption unit 94 transmits the encrypted terminal information or the content request to the terminal 11-2a through the transmission and reception unit 41. In addition, in the second embodiment, the key information (for example, "key 1" and "key 2") generated in the key generation unit 91 is transmitted to the terminal 11-2a, in advance. Thus, the encryption and decryption of the information between the information sharing server 12-2 and the terminal 11-2a may be realized.

Information Sharing Process Example of Second Embodiment

Figure 11:
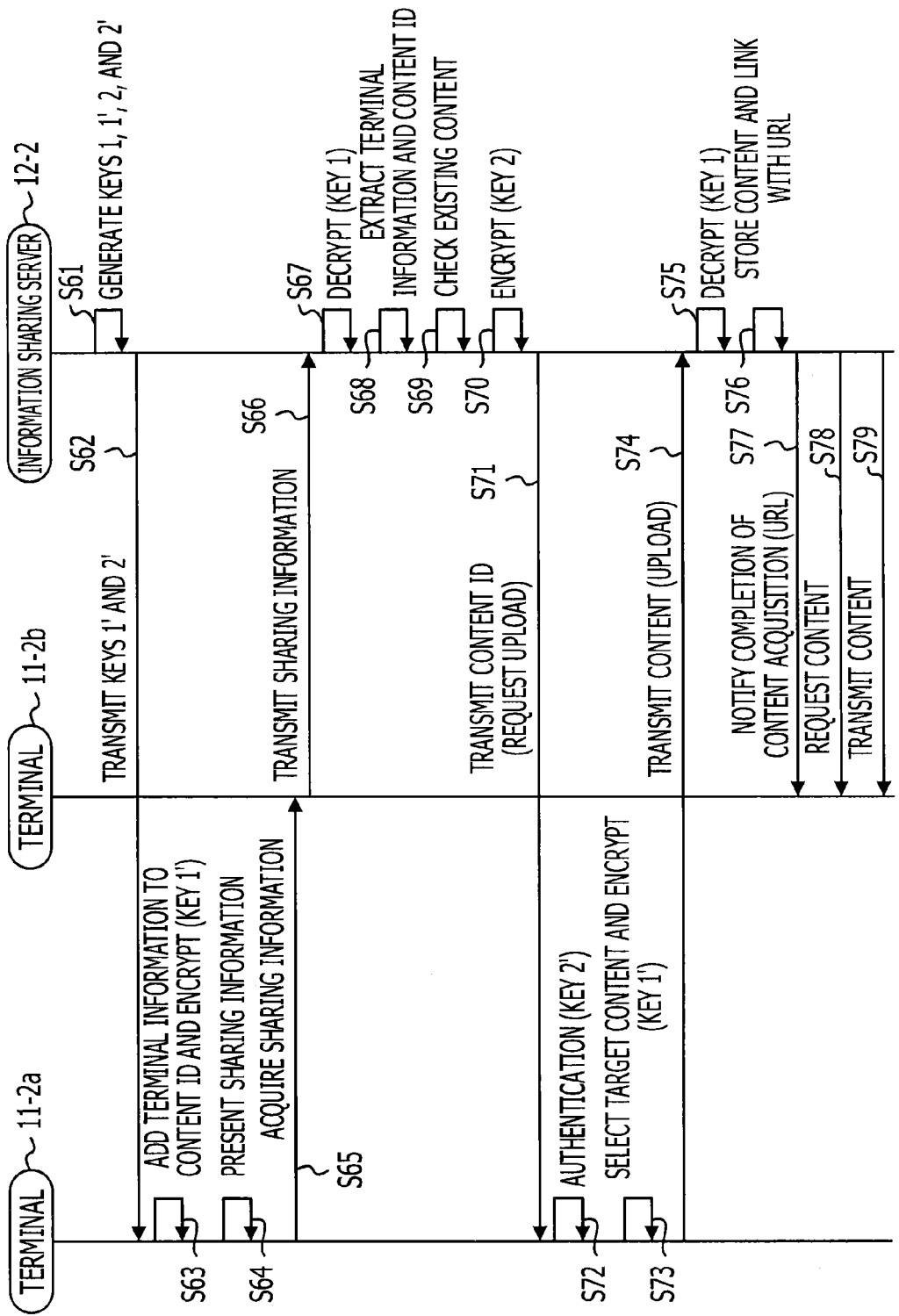
FIG. 11 is a sequence diagram illustrating an example of an information sharing process of the second embodiment.

Next, an example of an information sharing process of the second embodiment will be described with reference to FIG. 11. FIG. 11 is a sequence diagram illustrating the example of the information sharing process of the second embodiment. In addition, as an example, FIG. 11 includes the terminal 11-2a (first terminal), the terminal 11-2b (second terminal), and the information sharing server 12-2 described above.

In the information sharing process of the second embodiment, the information sharing server 12-2 generates the key information (key 1, key 1', key 2, and key 2') (S61), and transmits, for example, the key 1' and the key 2' which are public keys among the generated key information items, to the terminal 11-2a (S62). The terminal 11-2a adds the terminal information to the content ID of the content to be shared to generate the sharing information, and further, performs encryption of the sharing information using the predetermined key information (for example, key 1') obtained from the information sharing server 12-2 (S63). In addition, the terminal 11-2a presents the sharing information (S64). Further, the same method as the first embodiment described above may be used for a method of presenting, for example.

The terminal 11-2b acquires the sharing information presented in the terminal 11-2a (S65), and when a user desires to acquire the information (content) corresponding to the acquired sharing information, the sharing information thereof is transmitted to the information sharing server 12-2 (S66). In addition, the transmitted sharing information is maintained to be encrypted by the terminal 11-1a.

The information sharing server 12-2 performs decryption using the key information (for example, key 1) corresponding to the sharing information obtained by the terminal 11-2a (S67), and extracts the terminal information and the content ID from the decrypted sharing information (S68). Next, the information sharing server 12-2 checks whether or not there is already-existing content with respect to the extracted terminal information and content ID information (S69), and when there is no already-existing content, the information sharing server 12-2 performs encryption with respect to the content ID and the like using the predetermined key information (for example, key 2) (S70). In addition, the information sharing server 12-2 transmits the encrypted content ID to the terminal 11-2a corresponding to the terminal information, and sends acquisition request (upload request) of the content (S71).

When receiving the content ID from the information sharing server 12-2, the terminal 11-2a performs authentication using the key information (for example, key 2') corresponding to the key (key 2) which is used for the encryption (S72). Herein, the authentication is determined depending on whether or not the content ID may be decrypted. That is, in the second embodiment, when it is possible to decrypt the content ID using the predetermined key information (for example, key 2'), the communication between the terminal 11-2a and the information sharing server 12-2 is performed.

In addition, in the second embodiment, the authentication is not limited thereto, and for example, the information sharing server 12-2 may encrypt the terminal information obtained from the sharing information, may transmit the encrypted terminal information with the content ID, and may perform the authentication using the transmitted terminal information. In addition, in the second embodiment, the user ID and the password of the information sharing server 12-2 may be transmitted with the content ID, and the authentication may be performed using the transmitted user ID and password of the information sharing server 12-2.

When the result of the authentication is determined as OK (usable), the terminal 11-2a selects the target content of the content ID, and performs encryption with respect to the selected content using the predetermined key information (for example, key 1') (S73). After that, the terminal 11-2a transmits (uploads) the content to the information sharing server 12-2 (S74). In addition, in the process of S74, when the transmission and the reception of the data through the private communication line are established between the terminal 11-2a and the information sharing server 12-2, the content may be transmitted without the encryption.

The information sharing server 12-2 performs decryption of the content obtained from the terminal 11-2a with the key information (key 1) corresponding to the key information (key 1') which is used for the encryption process of the terminal 11-2a (S75), stores the obtained content, and performs the linking with the URL (S76). In addition, the information sharing server 12-2 transmits the acquisition completion notification of the content including the linked URL to the terminal 11-2b by the process of S76 (S77).

Further, when transmitting the acquisition completion notification of the content of S77, the encryption process is not performed since the acquisition completion notification is not the content as it is, but the encryption process may be performed with respect to the URL to be transmitted. In that case, key information for decrypting the encrypted URL is transmitted to the terminal 11-2b, in advance.

The terminal 11-2b sends content request to the information sharing server 12-2 based on the URL obtained from the information sharing server 12-2 (S78). The information sharing server 12-2 acquires the content corresponding to the content request, and transmits the acquired content to the terminal 11-2b (S79). In addition, in the second embodiment, in order that the encryption or the decryption is performed to avoid the leakage of the terminal information included in the sharing information to other users, for example, it is not desired to perform the encryption in the transmission process of the content illustrated in S79. However, in order to avoid the leakage of the content to another user, in the process of S79, for example, the encryption may be performed with respect to the content to be transmitted. In that case, key information for decrypting the encrypted content is transmitted to the terminal 11-2b, in advance.

In the information sharing process described above, when there is already-existing content in the process of S69, the acquisition completion notification of the content including the URL or the like corresponding to the already-existing content may be transmitted in the process of S77, without performing the processes of S70 to S76.

As described above, in the second embodiment, it is possible to easily share the information, and since the communication of the sharing information or the like due to the encryption is performed between the terminal 11-2 and the information sharing server 12-2, it is possible to improve the confidentialness of the information.

Next, the detailed content of the information sharing process of the first terminal (terminal 11-2a) and the information sharing server 12-2 described above will be described with reference to FIGS. 12 and 13. Since the second terminal (terminal 11-2b) performs the same process as the terminal 11-1b of the first embodiment described above, the detailed description thereof will be omitted. In addition, in the following description, the description overlapping the first embodiment is omitted, however, the content described in the first embodiment may also be applied to the second embodiment, in the same manner (same in third to fifth embodiments).

Information Sharing Process Example of First Terminal of Second Embodiment

Figure 12:
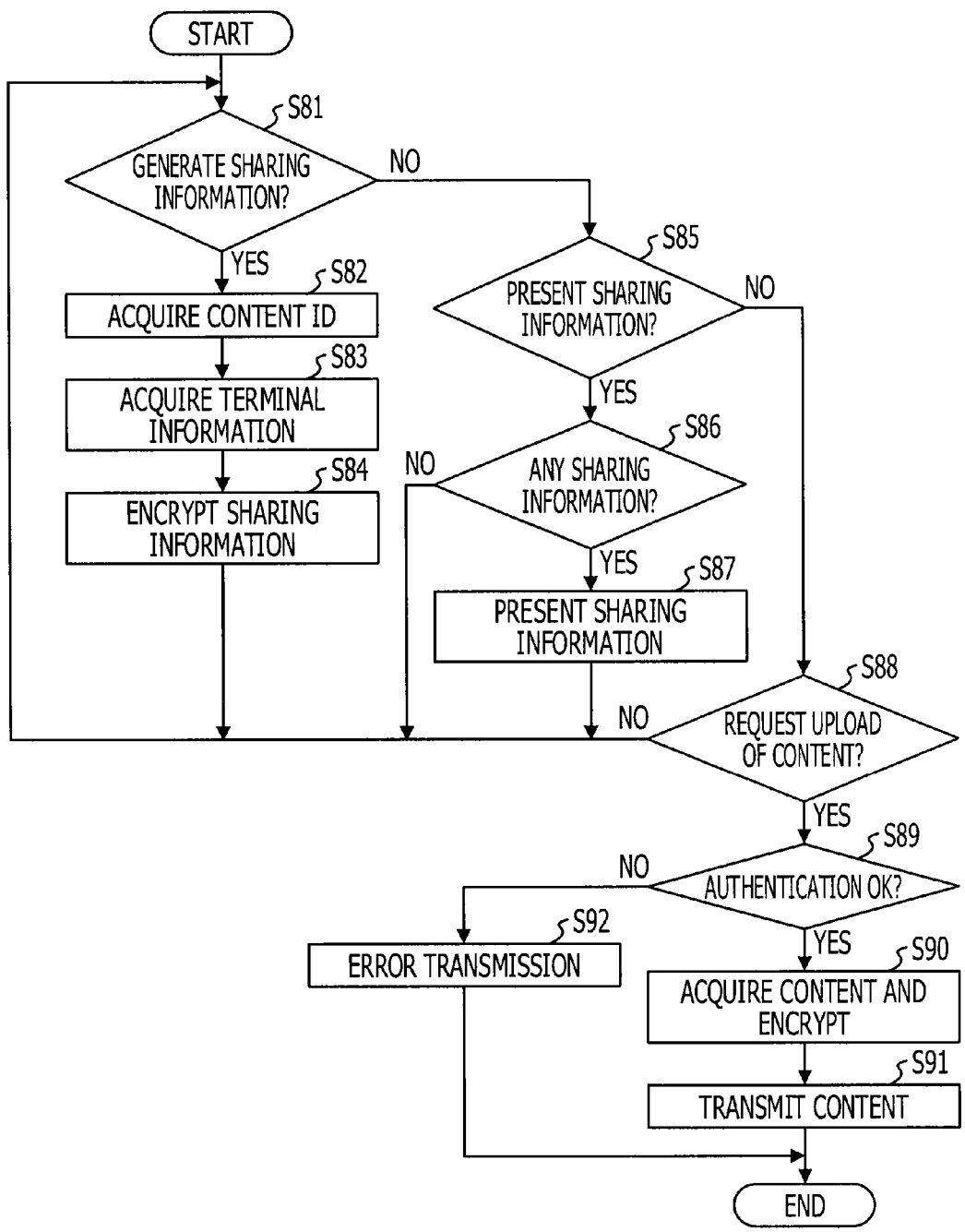
FIG. 12 is a flowchart illustrating an example of an information sharing process of a first terminal of the second embodiment.

FIG. 12 is a flowchart illustrating an example of the information sharing process of the first terminal of the second embodiment. First, the information sharing process of the first terminal illustrated in FIG. 12 determines whether or not to generate the sharing information corresponding to the information to be shared (content) (S81), and when generating the sharing information (YES in S81), the content ID which identifies the information to be shared is acquired (S82). In addition, the information sharing process acquires the terminal information of the first terminal (S83), encrypts the sharing information including the content ID and the terminal information (S84), and the process returns to the process of S81. When performing the encryption in the process of S84, in order to avoid the leakage of the terminal information to another user, for example, the target data to be encrypted may be only the terminal information. The predetermined key information is the key information obtained from the information sharing server 12-2, for example, however, it is not limited thereto.

In the process of S81, in a case of not generating the sharing information (NO in S81), the information sharing process determines whether or not to present the generated sharing information (S85). When presenting the sharing information (YES in S85), the information sharing process determines whether or not there is sharing information to be presented (S86), and when there is sharing information (YES in S86), the sharing information is presented (S87). In addition, in the process of S85, in a case of not presenting the sharing information (NO in S85), the information sharing process determines whether or not there is the upload request of the content from the information sharing server 12-2 (S88).

When there is the upload request of the content (YES in S88), the information sharing process performs authentication with respect to the request and determines whether or not the authentication result thereof is OK (S89). In addition, the upload request is acquired by the reception of the content ID transmitted from the information sharing server 12-2, for example. Further, for the authentication with respect to the request, the decryption may be performed with respect to the encrypted content ID by the predetermined key information and the authentication may be performed depending on whether or not the decryption result is properly obtained, however the authentication method is not limited thereto.

Herein, when it is authenticated as OK (YES in S89), the information sharing process acquires the content corresponding to the content ID to perform the encryption (S90), and transmits the encrypted content to the information sharing server 12-2 (S91). In addition, in the process of S89, when it is not authenticated as OK (NO in S89), error information is transmitted to the information sharing server 12-2 (S92).

In addition, when there is no upload request of the content (NO in S88), the information sharing process returns to the process of S81. In the process of S86, when there is no sharing information (NO in S86) or after the process of S87, the information sharing process returns to the process of S81.

Figure 13:
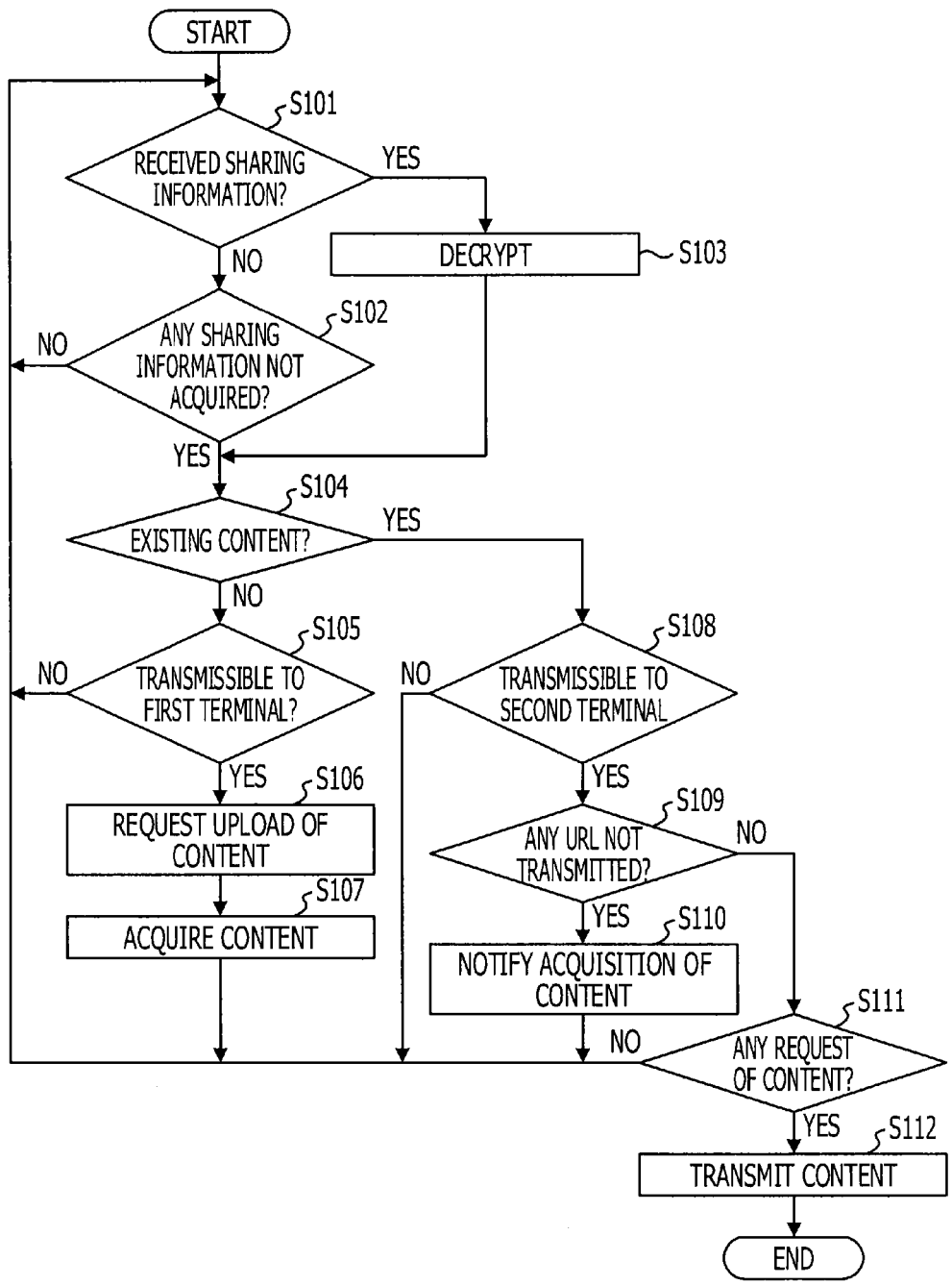
FIG. 13 is a flowchart illustrating an example of an information sharing process of an information sharing server of the second embodiment.

Information Sharing Process Example of Information Sharing Server 12-2 of Second Embodiment FIG. 13 is a flowchart illustrating an example of an information sharing process of the information sharing server of the second embodiment. The information sharing process of the information sharing server 12-2 illustrated in FIG. 13 determines whether or not the sharing information is received (S101), and when the sharing information is not received (NO in S101), the information sharing process determines whether or not there is sharing information not acquired (S102). When there is no sharing information not acquired (NO in S102), the information sharing process returns to the process of S101.

In addition, in the process of S101, when the sharing information is received (YES in S101), the information sharing process performs decryption with respect to the encrypted sharing information (S103). Herein, when there is the sharing information not acquired (YES in S102) or after the process of S103, the information sharing process determines whether or not there is content (already-existing content) which is already acquired in the content corresponding to the sharing information (S104).

When there is no already-existing content (NO in S104), the information sharing process determines whether or not the information sharing server 12-2 may communicate with the first terminal (terminal 11-2a) (S105). When the information sharing server 12-2 may communicate with the first terminal (YES in S105), the information sharing process sends the upload request of the content based on the content ID to the first terminal (S106), and acquires the corresponding content (S107), and the process returns to the process of S101. In addition, in the process of S105, when the information sharing server 12-2 may not communicate with the first terminal (NO in S105), the information sharing process returns to the process of S101.

In the process of S104, when there is the already-existing content (YES in S104), the information sharing process determines whether or not the information sharing server 12-2 may communicate with the second terminal (terminal 11-2b) (S108). When the information sharing server 12-2 may communicate with the second terminal (YES in S108), the information sharing process determines whether or not there is the URL not transmitted to the second terminal (S109). When there is the URL not transmitted (YES in S109), the information sharing process sends the acquisition notification of the content including the URL to the second terminal (S110), and the process returns to the process of S101. In addition, when there is no URL not transmitted (NO in S109), the information sharing process determines whether or not there is the request of the content based on the URL from the second terminal (S111), and when there is the request of the content (YES in S111), the content is transmitted to the second terminal (S112).

In addition, when there is no request of the content (NO in S111), the information sharing process returns to the process of S101. Further, in the process of S108, when the information sharing server 12-2 may not communicate with the second terminal (NO in S108), the information sharing process returns to the process of S101.

As described above, in the second embodiment, it is possible to easily share the information, and since the communication of the sharing information or the like due to the encryption is performed between the first terminal (terminal 11-2a), the second terminal (terminal 11-2b), and the information sharing server 12-2, it is possible to improve the confidentialness of the information.

Third Embodiment: Schematic Configuration Example of Information Sharing System

Figure 14:
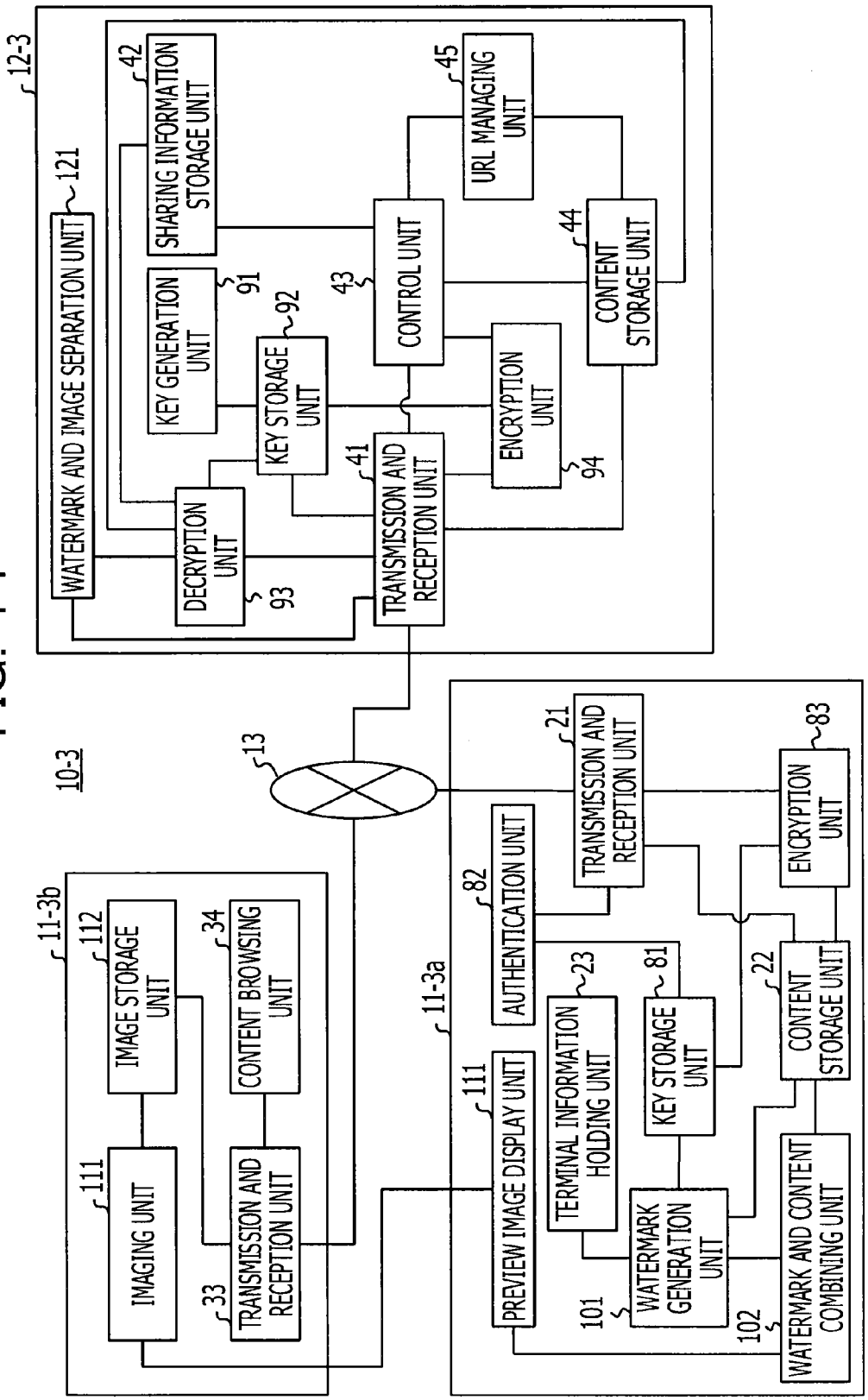
FIG. 14 is a diagram illustrating an example of a schematic configuration of an information sharing system of a third embodiment.

Next, an information sharing system of a third embodiment will be described with reference to FIG. 14. FIG. 14 is a diagram illustrating an example of a schematic configuration of the information sharing system of the third embodiment. In addition, in an information sharing system 10-3 illustrated in FIG. 14, the configuration parts which are the same as the information sharing systems 10-1 and 10-2 of the first embodiment and the second embodiment described above have the same reference numerals, and the detailed description thereof will be omitted, herein. Further, since the hardware configurations which are the same as the first embodiment described above may be applied to hardware configurations of a first terminal (terminal 11-3a), a second terminal (terminal 11-3b), and an information sharing server 12-3, the detailed description thereof will be omitted herein.

The information sharing system 10-3 illustrated in FIG. 14 includes the plurality of terminals 11-3a and 11-3b (hereinafter, referred to collectively as "terminals 11-3" if desired), and the information sharing server 12-3. In addition, the terminals 11-3 and the information sharing server 12-3 are connected in a state of being able to transmit and receive data through the communication network 13 or the like as described above. When compared to the second embodiment, in the third embodiment, a method of presenting the sharing information of the first terminal or a method of acquiring the sharing information of the second terminal will be described in detail.

That is, in the third embodiment, when sharing certain content (for example, an image) by the content owner, the watermark information of the sharing information is embedded in the content, and the content is presented (for example, preview display). In addition, the image content to be embedded is embedded with respect to the preview image as illustrated in FIG. 9, not the original content, for example. Thus, in the third embodiment, it is possible to reduce the data capacity and reduce the load of the screen display or the load at the time of transmission of the data.

In addition, when the content sharer desires to acquire the image content for sharing, the sharing information is embedded, the preview-displayed image content is captured, and the sharing information is extracted from the captured image.

Next, the terminals 11-3a and 11-3b, and the information sharing server 12-3 of the third embodiment will be described in detail.

Third Embodiment: Configuration Example of Function of Terminal 11-3a

The terminal 11-3a illustrated in FIG. 14 includes the transmission and reception unit 21, the content storage unit 22, the terminal information holding unit 23, the key storage unit 81, the authentication 82, the encryption unit 83, a watermark generation unit 101, a watermark and content combining unit 102, and a preview image display unit 103. Herein, as the detailed example of the sharing information generation unit 24 and the sharing information presentation unit 25 included in the terminal 11-2a of the second embodiment, the terminal 11-3a includes the watermark generation unit 101, the watermark and content combining unit 102, and the preview image display unit 103. Accordingly, in the description below, the watermark generation unit 101, the watermark and content combining unit 102, and the preview image display unit 103 will be mainly described, and since the descriptions of the other configurations are same as the description of the embodiments described above, the description thereof will be omitted.

In the third embodiment, when the content to be shared (for example, image) is set from the content stored in the content storage unit 22, for example, the watermark is generated in order to embed the terminal information or the corresponding content ID to the set content. The watermark indicates that information (watermark information) which is not visually seen by the user is embedded in a part of the content such as an image or a moving image, for example, however, it is not limited thereto. In addition, the watermark information includes the terminal information, the content ID, and the information regarding the access key to the terminal, for example, however, it is not limited thereto.

In detail, the watermark generation unit 101 acquires the content ID corresponding to the content to be shared from the content storage unit 22, and acquires the terminal information from the terminal information holding unit 23. The watermark generation unit 101 performs encryption with respect to the sharing information including the acquired content ID and terminal information with the predetermined key information (for example, key 1') obtained from the key storage unit 81, and generates watermark information with respect to the encrypted sharing information. In addition, the encryption and the generation of the watermark information described above may be performed only with respect to the terminal information, as a target. Thus, it is possible to avoid the leakage of the terminal information to another user.

The watermark and content combining unit 102 combines the watermark of the sharing information obtained from the watermark generation unit 101 and the preview image of the content obtained from the content storage unit 22, for example. In addition, a combining method of the watermark and content combining unit 102 is preferably overlapped optically on the preview image so as to be able to extract the preview image from the image captured by a camera, for example, however, it is not limited thereto. Further, as the combining method, there is a method of embedding the watermark to the entire preview image, or a method of embedding the watermark to a part of the preview image; however, it is not limited thereto.

The watermark and content combining unit 102 may embed the watermark information with respect to the content such as the preview image, almost with no effect. In addition, the preview image to which the watermark information is embedded is seen to not to be different from the original data; however, it is possible to detect the watermark information by using certain detecting software of the digital watermark, for example.

The preview image display unit 103 displays the combined image (preview image) obtained by the watermark and content combining unit 102.

Third Embodiment: Configuration Example of Function of Terminal 11-3*b*

The terminal 11-3*b* illustrated in FIG. 14 includes an imaging unit 111, an image storage unit 112, the transmission and reception unit 33, and the content browsing unit 34. As the detailed example of the sharing information acquisition unit 31 and the sharing information storage unit 32 included in the terminal 11-2*b* of the second terminal, the terminal 11-3*b* of the third embodiment includes the imaging unit 111 and the image storage unit 112. In the following description, the imaging unit 111 and the image storage unit 112 will be mainly described, and since other configurations have the same description as described above, the description thereof will be omitted.

The imaging unit 111 is a digital camera or the like, for example. The imaging unit 111 captures the preview image displayed on a screen (preview image display unit 103) of the terminal 11-3*a*. Accordingly, it is also possible to acquire the watermark information included in the preview image. The image captured in the imaging unit 111 is stored in the image storage unit 112. In addition, the image storage unit 112 is a memory unit, for example.

When a user desires to acquire the original content (for example, an image) corresponding to the preview image, the transmission and reception unit 33 transmits the image which is obtained by capturing the preview image, to the information sharing server 12-3. In addition, the transmission and reception unit 33 acquires the acquisition completion notification corresponding to the transmitted information from the information sharing server 12-3, and the content obtained from the acquired information may be browsed by the content browsing unit 34. Further, the transmission and reception unit 33 may store the acquired content in the image storage unit 112.

Third Embodiment: Configuration Example of Function of Information Sharing Server 12-3

The information sharing server 12-3 illustrated in FIG. 14 includes the transmission and reception unit 41, the sharing information storage unit 42, the control unit 43, the content storage unit 44, the URL managing unit 45, the key generation unit 91, the key storage unit 92, the decryption unit 93, the encryption unit 94, and a watermark and image separation unit 121. In addition to the configuration of the information sharing server 12-2 of the second embodiment described above, the information sharing server 12-3 of the third embodiment includes the watermark and image separation unit 121. Accordingly, in the following description, the watermark and image separation unit 121 will be mainly described, and the description of the same configuration parts as the above embodiments will be omitted.

The watermark and image separation unit 121 separates the watermark information from the preview image from the terminal 12-3*b* obtained by the transmission and reception unit 41. In addition, the watermark and image separation unit 121 may detect the watermark information using certain detecting software of the digital watermark; however, it is not limited thereto.

The watermark and image separation unit 121 outputs the separated watermark information to the decryption unit 93. The decryption unit 93 performs the decryption with respect to the watermark information with the predetermined key information (for example, key 1), and acquires the sharing information such as the content ID and the terminal information. In addition, the acquired content ID or terminal information is stored in the sharing information storage unit 42. In the third embodiment, since the terminal information or the like is embedded as the watermark information, the terminal information does not leak to another user although the encryption or the like are not performed, but the encryption or the like may be performed to further improve the security.

Information Sharing Process Example of Third Embodiment

Figure 15:
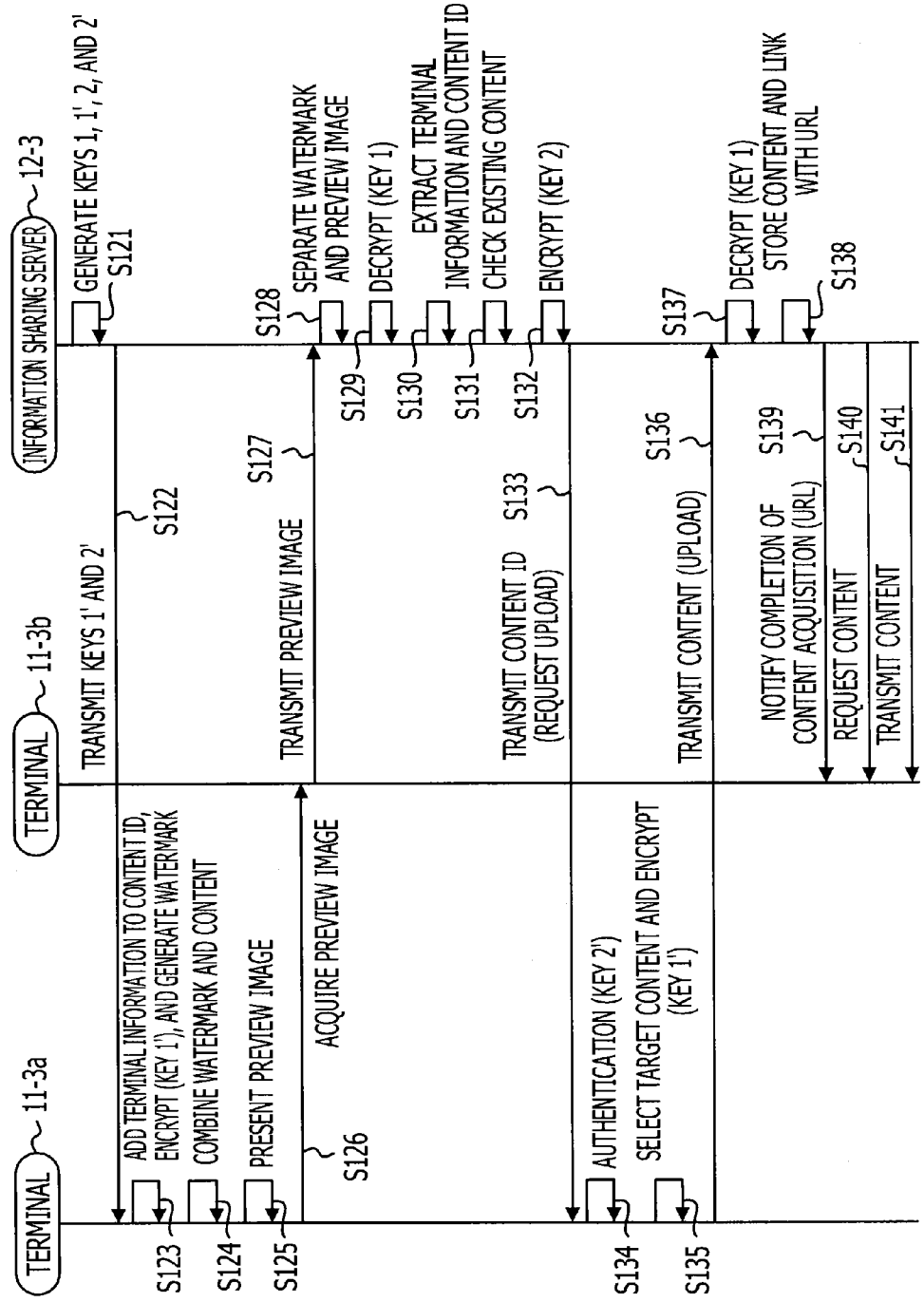
FIG. 15 is a sequence diagram illustrating an example of an information sharing process of the third embodiment.

Next, an example of an information sharing process of the third embodiment will be described with reference to FIG. 15. FIG. 15 is a sequence diagram illustrating the example of the information sharing process of the third embodiment. In addition, as an example, FIG. 15 includes the terminal 11-3*a* (first terminal), the terminal 11-3*b* (second terminal), and the information sharing server 12-3 described above.

In the information sharing process of the third embodiment, the information sharing server 12-3 generates the key information (key 1, key 1', key 2, and key 2') (S121), and transmits, for example, the key 1' and the key 2' which are public keys among the generated key information items, to the terminal 11-3*a* (S122). The terminal 11-3*a* adds the terminal information to the content ID of the content to be shared to generate the sharing information, performs encryption using the predetermined key information (for example, key 1') obtained from the information sharing server 12-3, and generates the watermark information with respect to the encrypted sharing information (S123). In addition, the terminal 12-3*a* combines the watermark information and the content (for example, preview image) (S124), and displays the combined preview image (S125).

By capturing the preview image displayed on the screen of the terminal 11-3*a*, the terminal 11-3*b* acquires the preview image (S126). In addition, when a user desires to acquire the original content of the acquired preview image, the terminal 11-3*b* transmits the captured preview image to the information sharing server 12-3 (S127).

The information sharing server 12-3 separates the watermark information and the image which is the content, from the preview image obtained from the terminal 11-3*b* (S128), and performs decryption of the separated watermark information using the predetermined key information (for example, key 1) (S129). In addition, the information sharing server 12-3 extracts the terminal information and the content ID from the decrypted sharing information (S130).

Next, the information sharing server 12-3 corresponds to the content ID.

Next, the information sharing server 12-3 checks whether or not there is already-existing content corresponding to the extracted terminal information and content ID information (S131), and when there is no already-existing content, the information sharing server 12-3 performs encryption with respect to the content ID or the like, using the predetermined key information (for example, key 2) (S132). In addition, the information sharing server 12-3 transmits the encrypted content ID to the terminal 11-3*a* corresponding to the terminal information, and sends the acquisition request (upload request) of the content (S133).

When receiving the content ID from the information sharing server 12-3, the terminal 11-3a performs authentication using the key information (for example, key 2') corresponding to the key (key 2) which is used for the encryption (S134).

If the authentication is determined as a success (usable), the terminal 11-3a selects the target content of the content ID, and performs encryption with respect to the selected content using the predetermined key information (for example, key 1') (S135). After that, the terminal 11-3a transmits (uploads) the content to the information sharing server 12-3 (S136).

The information sharing server 12-3 performs decryption of the content obtained from the terminal 11-3a with the key information (key 1) corresponding to the key information (key 1') which is used for the encryption process of the terminal 11-3a (S137), stores the obtained content, and performs the linking with the URL (S138). In addition, the information sharing server 12-3 transmits the acquisition completion notification of the content including the linked URL to the terminal 11-3b by the process of S138 (S139).

The terminal 11-3b sends request of the content to the information sharing server 12-3 based on the URL obtained from the information sharing server 12-3 (S140). The information sharing server 12-3 acquires the content corresponding to the request of the content, and transmits the acquired content to the terminal 11-3b (S141).

In the information sharing process described above, when there is already-exiting content in the process of S131, the acquisition completion notification of the content including the URL or the like corresponding to the already-existing content may be transmitted in the process of S139, without performing the processes of S132 to S138.

As described above, in the third embodiment, it is possible to easily share the information using the preview image to which the watermark information is embedded.

Next, the detailed content of the information sharing process of the first terminal 11-3a, the terminal 11-3b, and the information sharing server 12-3 described above will be described with reference to FIGS. 16 to 18.

Information Sharing Process Example of First Terminal of Third Embodiment

Figure 16:
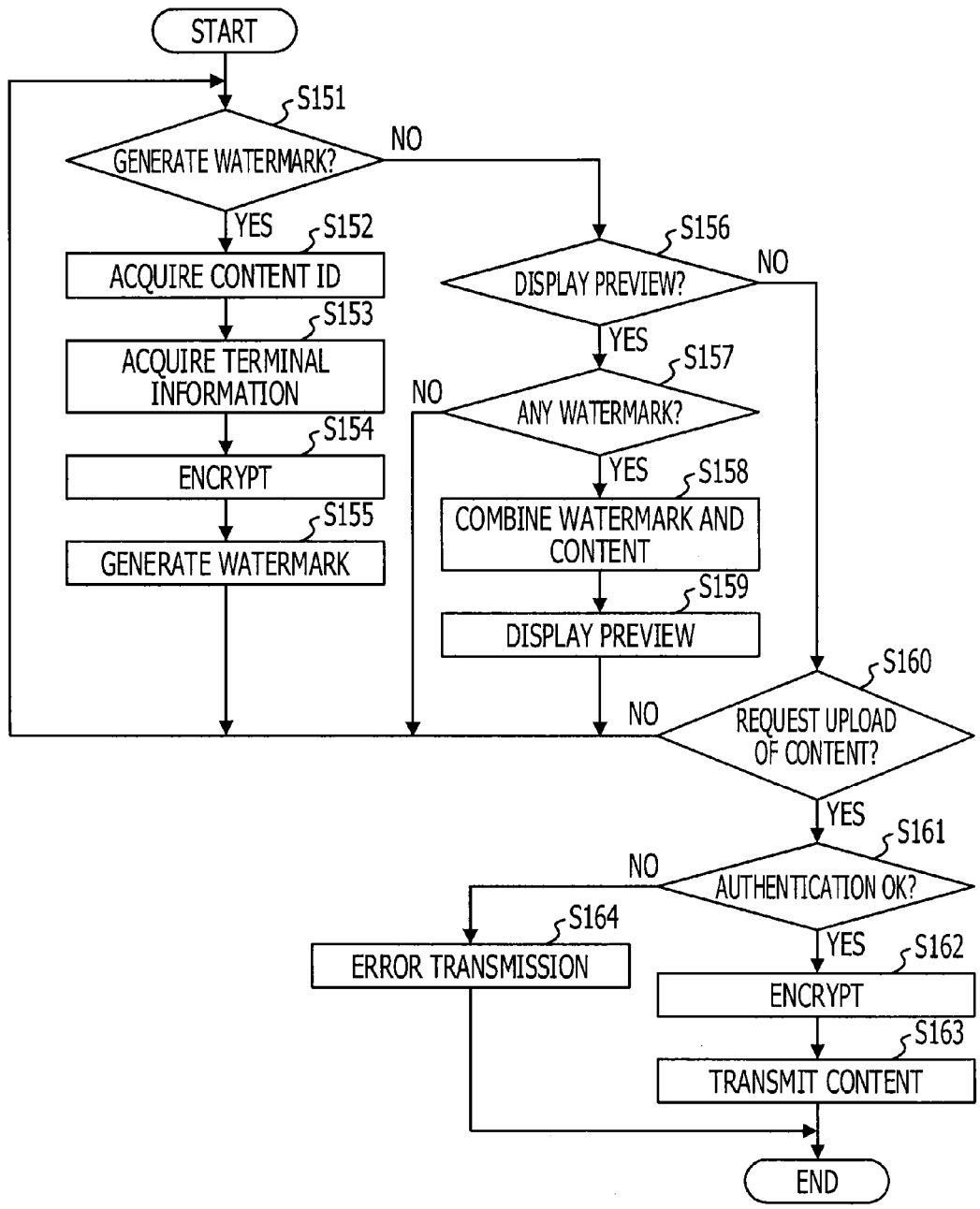
FIG. 16 is a flowchart illustrating an example of an information sharing process of a first terminal of the third embodiment.

FIG. 16 is a flowchart illustrating an example of the information sharing process of the first terminal of the third embodiment. First, the information sharing process of the first terminal illustrated in FIG. 16 determines whether or not to generate the watermark (S151), and when creating the watermark (YES in S151), the content ID which identifies the information to be shared is acquired (S152). In addition, the information sharing process acquires the terminal information of the first terminal (S153), encrypts the sharing information including the acquired content ID and terminal information (S154), and generates the watermark using the encrypted sharing information (S155).

Next, in S151, in a case of not generating the watermark (NO in S151), the information sharing process determines whether or not to display the preview of the content to be shared (S156). In addition, the case of not generating the watermark includes a state where the watermark is previously generated.

When performing the preview display (YES in S156), the information sharing process determines whether or not there is a watermark corresponding to the content, preview of which is to be displayed (S157). In addition, when there is a watermark corresponding to the content, preview of which is to be displayed (YES in S157), the information sharing process performs the watermark and content combining (S158), and displays the preview of the combined content (S159).

In the process of S156, in a case of not displaying the preview (NO in S156), the process determines whether or not there is an upload request of the content from the information sharing server 12-3 (S160). In addition, the case of not displaying the preview includes a state where the second terminal previously acquires the image obtained by capturing the preview image, for example.

When there is an upload request of the content, preview of which is displayed (YES in S160), the information sharing process performs the authentication with respect to the request, and determines whether or not the authentication result thereof is OK (S161). Herein, when the authentication is OK (YES in S161), the information sharing process performs encryption with respect to the requested content (S162), and transmits the encrypted content to the information sharing server 12-3 (S163). In addition, in the process of S161, when it is not authenticated as OK (NO in S161), the error information is transmitted to the information sharing server 12-3 (S164).

When there is no upload request of the content (NO in S160), the information sharing process returns to the process of S151. In the information sharing process, in the process of S157, when there is no watermark (NO in S157) and after the process of S159, the process returns to the process of S151.

Information Sharing Process Example of Second Terminal of Third Embodiment

Figure 17:
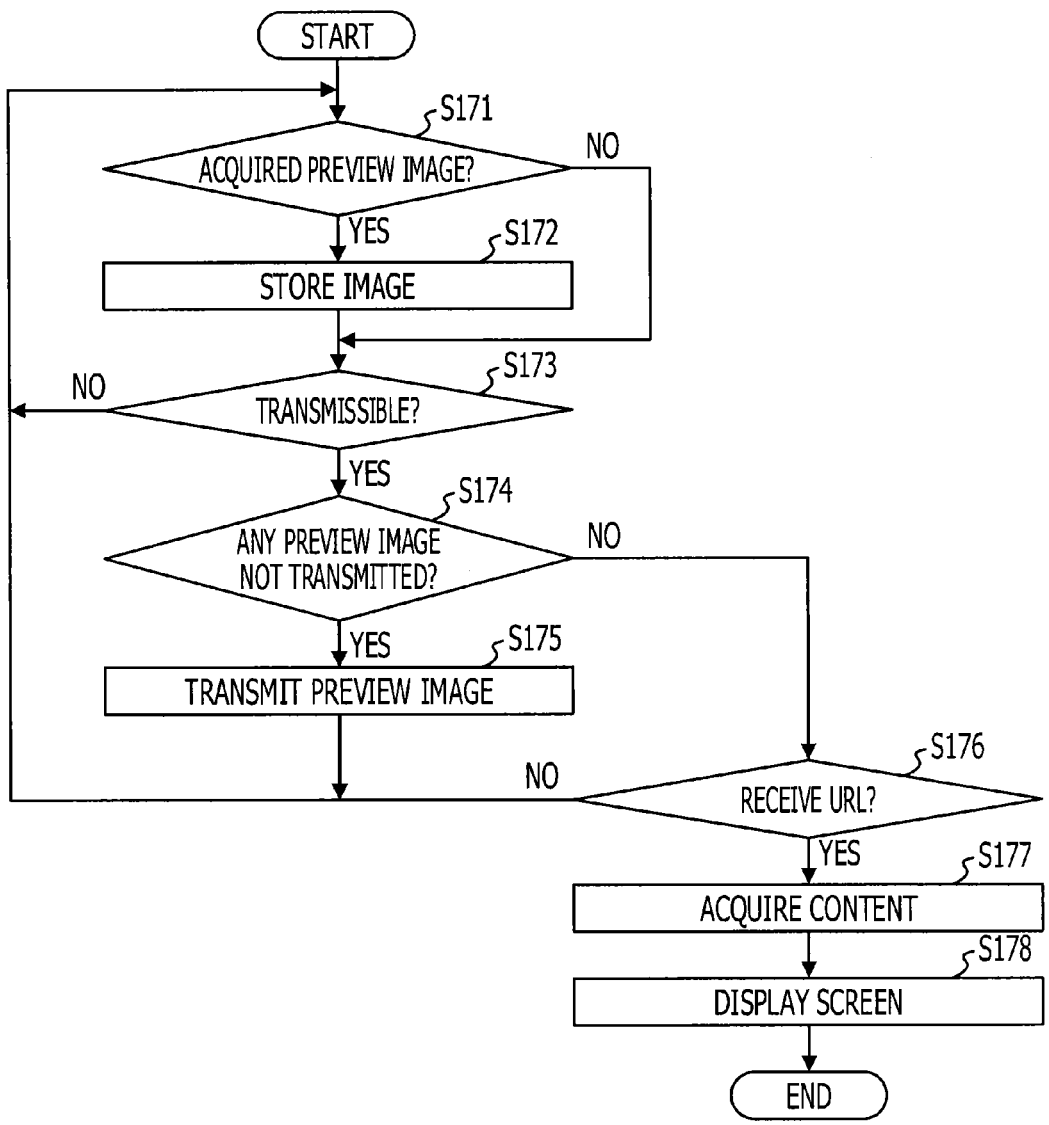
FIG. 17 is a flowchart illustrating an example of an information sharing process of a second terminal of the third embodiment.

Next, an information sharing process of the second terminal (terminal 11-3b) of the third embodiment will be described with reference to FIG. 17. FIG. 17 is a flowchart illustrating an example of the information sharing process of the second terminal of the third embodiment.

The information sharing process of the terminal 11-3b illustrated in FIG. 17 determines whether or not the preview image is acquired from the terminal 11-3a (S171), and when the sharing information is acquired (YES in S171), the acquired preview image is stored (S172). Next, after the process of S172 or in the process of S171, when the preview image is not acquired (NO in S171), the information sharing process determines whether or not the second terminal may communicate with the information sharing server 12-3 (S173). When the second terminal may not communicate with the information sharing server 12-3 (NO in S173), the information sharing process returns to the process of S171. In addition, when the second terminal may communicate with the information sharing server 12-3 (YES in S173), the information sharing process determines whether or not there is a preview image not transmitted (S174). When there is a preview image not transmitted (YES in S174), the information sharing process transmits the preview image (S175) and returns to the process of S171.

In addition, in the process of S174, when there is no preview image not transmitted (NO in S174), the information sharing process determines whether or not the URL obtained from the information sharing server 12-3 is received (S176). Herein, as described above, the URL is the acquisition completion notification of the content including the address information of the storage destination of the content corresponding to the preview image transmitted to the information sharing server 12-3, but it is not limited thereto.

When the URL is received (YES in S176), the information sharing process acquires the content corresponding to the URL (S177), and displays the acquired content on the screen (S178). Thus, it is possible for a user to browse the sharing information of another terminal on the screen from the preview screen.

In addition, in the process of S176 described above, in a case of not receiving the URL (NO in S176), the information sharing process returns to the process of S171.

Figure 18:
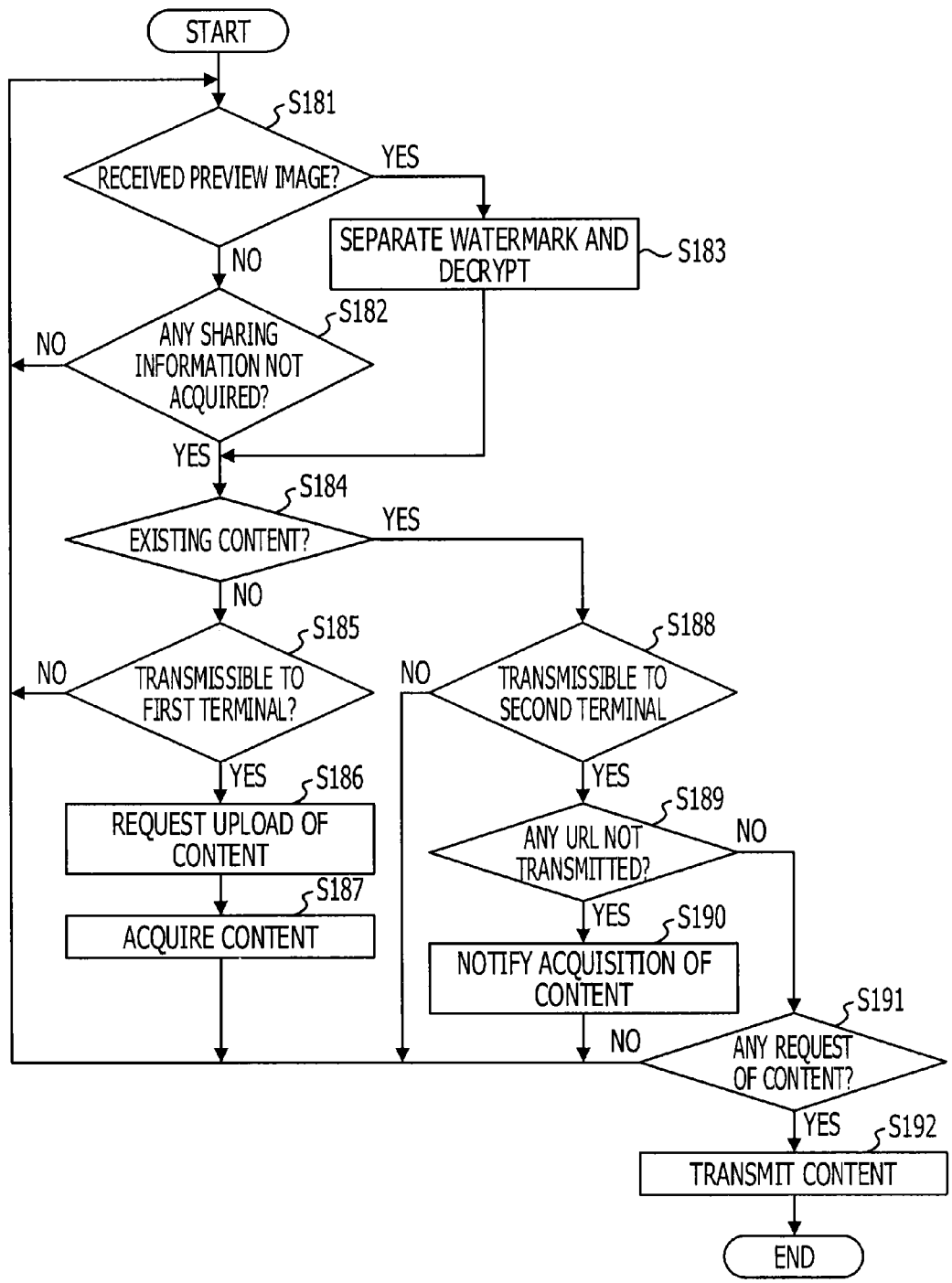
FIG. 18 is a flowchart illustrating an example of an information sharing process of an information sharing server of the third embodiment.

Information Sharing Process Example of Information Sharing Server 12-3 of Third Embodiment FIG. 18 is a flowchart illustrating an example of an information sharing process of the information sharing server of the third embodiment. The information sharing process of the information sharing server 12-3 illustrated in FIG. 18 determines whether or not the preview image is received (S181), and when the preview image is not received (NO in S181), the process determines whether or not there is sharing information not acquired (S182). When there is no sharing information not acquired (NO in S182), the information sharing process returns to the process of S181.

In addition, in the process of S181, when the preview image is received (YES in S181), the information sharing process separates the watermark portion from the preview image, and performs decryption of the watermark portion to acquire the sharing information (S183).

In the process of S182, when there is sharing information not acquired (YES in S182) or after the process of S183, the information sharing process determines whether or not the content included in the sharing information is the already-existing content (S184).

When there is no already-existing content (NO in S184), the information sharing process determines whether or not the information sharing server 12-3 may communicate with the first terminal (terminal 11-3a) (S185). When the information sharing server 12-3 may communicate with the first terminal (YES in S185), the information sharing process sends the upload request of the content to the first terminal based on the content ID or the like (S186), acquires the corresponding content (S187), and returns to the process of S181. In addition, in the process of S185, when the information sharing server 12-3 may not communicate with the first terminal (NO in S185), the information sharing process returns to the S181.

In addition, in the process of S184, when there is already-existing content (YES in S184), the information sharing process determines whether or not the information sharing server 12-3 may communicate with the second terminal (terminal 11-3b) (S188). In the process of S188, when the information sharing server 12-3 may communicate with the second terminal (YES in S188), the information sharing process determines whether or not there is the URL not transmitted to the second terminal (S189). When there is the URL not transmitted (YES in S189), the information sharing process sends the acquisition notification of the content including the URL to the second terminal (S190), and returns to the process of S181. In addition, when there is no URL not transmitted (NO in S189), the information sharing process determines whether or not there is the request of the content based on the URL from the second terminal (S191), and when there is the request of the content (YES in S191), the content is transmitted to the second terminal (S192).

In addition, when there is no request of the content (NO in S191), the information sharing process returns to the process of S181. Further, in the process of S188, when the information sharing server 12-3 may not communicate with the second terminal (NO in S188), the information sharing process returns to the process of S181.

Content of Information Sharing According to Third Embodiment

Figure 19:
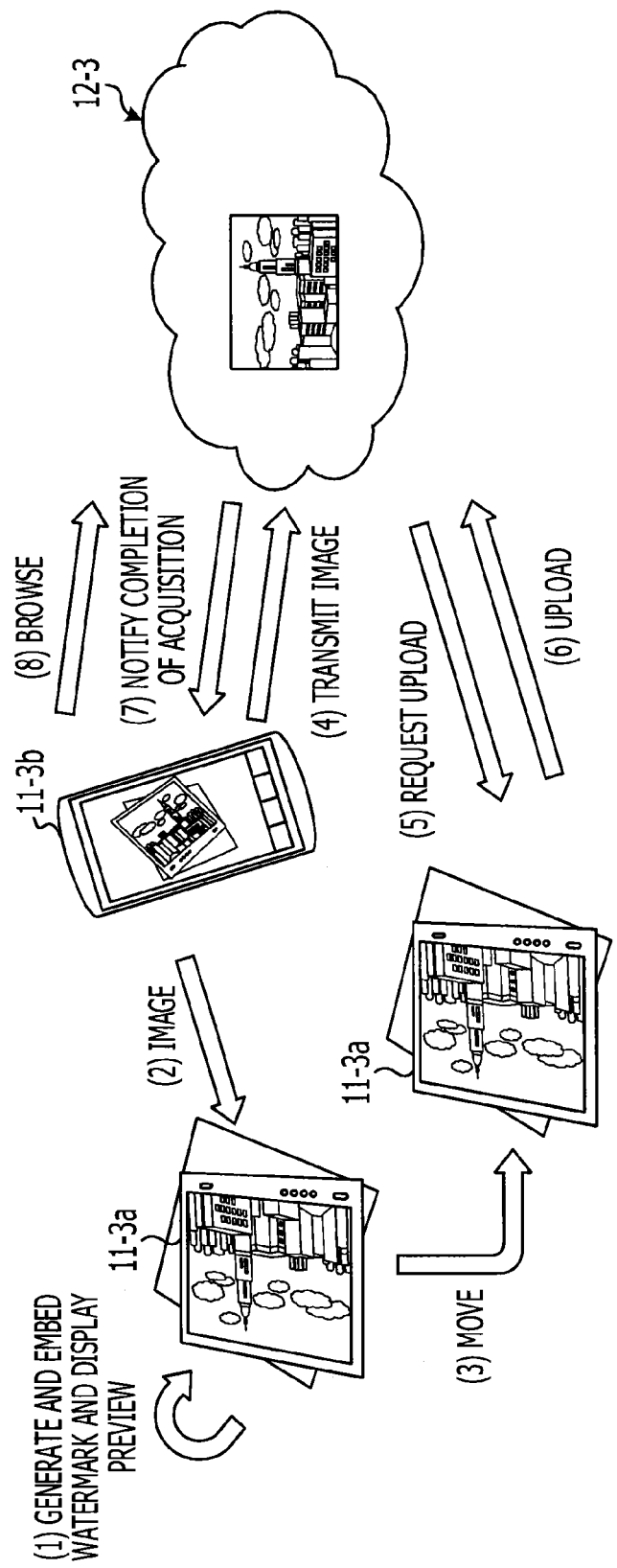
FIG. 19 is a diagram for describing content of information sharing according to the third embodiment.

Herein, the content of the information sharing according to the third embodiment will be described with reference to FIG. 19. FIG. 19 is a diagram for illustrating content of information sharing according to the third embodiment. In the example of FIG. 19, the content of the information sharing using the first terminal (terminal 11-3a), the second terminal (11-3b), and the information sharing server 12-3 will be described, however, it is not limited thereto, and for example, the plurality of first terminals or second terminals may exist. In addition, in the example of FIG. 19, the function of the information sharing server 12-3 described above is provided as a so-called cloud service, for example.

In the example of FIG. 19, in the third embodiment, the information sharing is performed with the procedure of (1) to (8) described above. In detail, first, the terminal 11-3a of the content owner generates the watermark of the sharing information corresponding to the image to be shared, embeds the watermark information to the preview image of the image to be shared, and displays the preview on the screen ((1) of FIG. 19). Next, by capturing the displayed preview image with the camera included in the terminal 11-3b by the content owner, the sharer acquires the preview image to which the watermark is embedded ((2) of FIG. 19). Herein, in (1) of FIG. 19, the terminal 11-3a may not communicate with the information sharing server 12-3, however, the terminal 11-3a is set to be communicated with the information sharing server 12-3 with the movement ((3) of FIG. 19).

The sharer transmits the preview image to which the watermark is embedded from the terminal 11-3b, to the information sharing server 12-3 ((4) of FIG. 19). The information sharing server 12-3 receives the request from the terminal 11-3b, and sends the upload request of the content corresponding to the terminal 11-3a ((5) of FIG. 19).

The terminal 11-3a uploads the target content to the information sharing server 12-3 according to the upload request from the information sharing server 12-3 ((6) of FIG. 19). Herein, the information sharing server 12-3 stores the uploaded content in a certain location, performs the linking with the address information (URL) of the storage destination, and transmits the acquisition completion notification including the URL to the terminal 11-3b of the sharer ((7) of FIG. 19). Accordingly, the sharer may receive the acquisition completion notification of the content, acquire the content based on the URL or the like included in the acquisition completion notification of the content, and browse the content by displaying the content on the screen of the terminal 11-3b ((8) of FIG. 19). In addition, in the example of FIG. 19, the encryption or the decryption process described above is not included, however, in the third embodiment, the encryption or the decryption process may be performed, or may not be performed.

As described above, in the third embodiment, it is possible to easily share the information using the preview image to which the watermark information is embedded.

Figure 20:
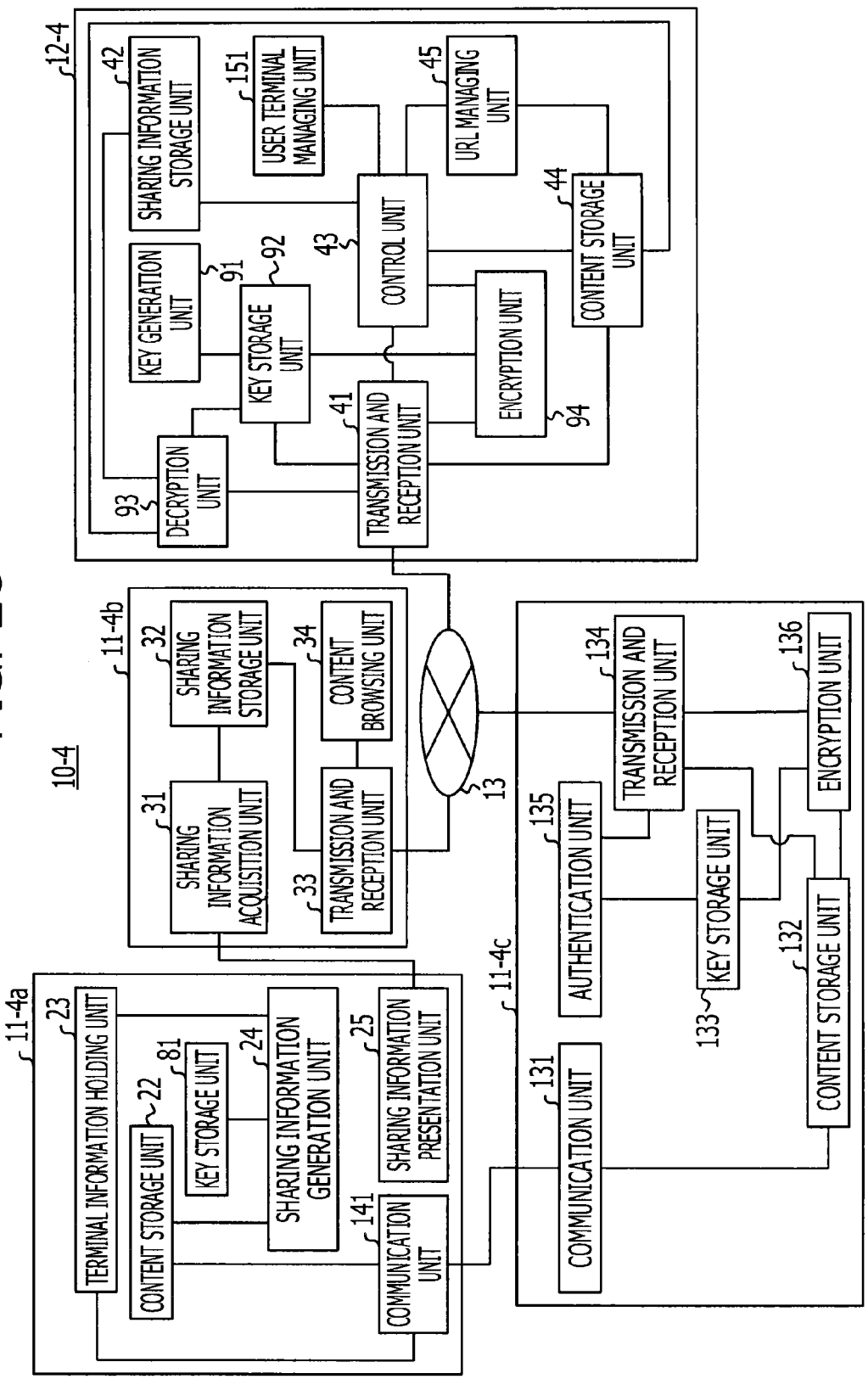
FIG. 20 is a diagram illustrating an example of a schematic configuration of an information sharing system of a fourth embodiment.

Fourth Embodiment: Schematic Configuration Example of Information Sharing System Next, an information sharing system of a fourth embodiment will be described with reference to FIG. 20. FIG. 20 is a diagram illustrating an example of a schematic configuration of the information sharing system of the fourth embodiment. In addition, in an information sharing system 10-4 illustrated in FIG. 20, the configuration parts which are the same as the information sharing systems 10-1 to 10-3 of the first to third embodiments described above have the same reference numerals, and the detailed description thereof will be omitted, herein.

The information sharing system 10-4 illustrated in FIG. 20 includes a plurality of terminals 11-4a, 11-4b, and 11-4c (hereinafter, referred to collectively as "terminals 11-4" if desired), and an information sharing server 12-4. In addition, except for the terminal 11-4a, the terminals 11-4 and the information sharing server 12-4 are connected in a state of being able to transmit and receive data through the communication network 13 or the like as described above.

When compared to the first to third embodiments, in the fourth embodiment, an example in which the configuration included in the first terminal described above is separated to the plurality of terminals will be illustrated. That is, the fourth embodiment includes a third terminal (terminal 11-4c), and the terminal 11-4a and the terminal 11-4c are terminals which are used by the content owner. The terminal 11-4b has the same configuration as the first embodiment described above.

In the fourth embodiment, the content is not managed by the terminal 11-4a unlike the configuration of the first embodiment, and the content is managed by the terminal 11-4c. Accordingly, for the terminal 11-4c, it is preferable to use a PC or a server including a hard disk drive (HDD) having a large capacity so as to be able to manage the plurality of content items, for example, however, it is not limited thereto. Since the configuration of the hardware of the terminal 11-4c may use the same configuration as the information sharing server 12-1 described above, the description thereof will be omitted.

In the fourth embodiment, although the terminal 11-4a is a terminal which may not perform the communication or a terminal which is not in a environment to perform the communication, for example, it is possible to transmit the content to the information sharing server 12-4 through the terminal 11-4c and easily share the information.

Next, the terminals 11-4a, 11-4b, and 11-4c, and the information sharing server 12-4 of the fourth embodiment will be described in detail. Since the same configuration as the terminals 11-1b and 11-2b of the first embodiment and the second embodiment described above may be applied to the terminal 11-4b illustrated in FIG. 20, the description thereof will be omitted.

Fourth Embodiment: Configuration Example of Function of Terminal 11-4a

The terminal 11-4a illustrated in FIG. 20 includes the content storage unit 22, the terminal information holding unit 23, the sharing information generation unit 24, and the sharing information presentation unit 25, the key storage unit 81, and a communication unit 141.

The communication unit 141 is an interface for communicating with the terminal 11-4c, and performs the transmission of the content or the content ID, for example. In addition, the communication unit 141 may add and transmit the terminal information obtained from the terminal information holding unit 23 with respect to the content or content ID to be transmitted to the terminal 11-4c. Accordingly, when the terminal 11-4c receives the content from the plurality of terminals, it is possible to specify the content based on the terminal information and the content ID.

Herein, the communication by the communication unit 141 may be short-distance wireless communication or the like, such as infrared data communication or Bluetooth, but it is not limited thereto, and the communication may be communication using a wired cable or the like such as a USB cable, for example. In addition, the communication unit 141 may perform movement of the data using a recording medium such as a SD card, for example.

The sharing information generation unit 24 acquires the content ID of the content to be shared from the content stored in the content storage unit 22, acquires the terminal information from the terminal information holding unit 23, and encrypts the sharing information using the predetermined key information obtained from the key storage unit 81. In addition, the terminal information of the fourth embodiment may be the terminal information of the terminal 11-4a which presents the sharing information, or may be the terminal information of the terminal 11-4c which sends request of the content from the information sharing server 12-4, or may include both. The sharing information generated by the sharing information generation unit 24 is presented by the sharing information presentation unit, and is acquired in the terminal 11-4b.

Fourth Embodiment: Configuration Example of Function of Terminal 11-4c

The terminal 11-4c illustrated in FIG. 20 includes a communication unit 131, a content storage unit 132, a key storage unit 133, a transmission and reception unit 134, an authentication unit 135, and an encryption unit 136.

The communication unit 131 performs communication with a communication unit 141 of the terminal 11-4a, and acquires the content, the content ID, and the like. The acquired content and the content ID may include the terminal information. In addition, the communication unit 131 outputs the acquired content or content ID to the content storage unit 132. The content storage unit 132 is a memory unit which stores the content or the content ID obtained from the communication unit 131. In addition, the content storage unit 132 extracts the content corresponding to the request of the content (content ID) from the information sharing server 12-4 obtained from the transmission and reception unit 134, and outputs the extracted content to the encryption unit 136.

The key storage unit 133 is a memory unit which stores one or plurality of key information items obtained from the information sharing server 12-4. The transmission and reception unit 134 performs transmission and reception of data between the terminal 11-4c and the information sharing server 12-4 through the communication network 13. In addition, the authentication unit 135 performs authentication with respect to an access request (including request of the content) from the information sharing server 12-4 based on the key information obtained from the key storage unit 133.

When transmitting the content corresponding to the request of the content from the information sharing server 12-4, the encryption unit 136 performs encryption with the predetermined key information obtained from the key storage unit 133. The encrypted content is output to the transmission and reception unit 134, and is transmitted to the information sharing server 12-4 from the transmission and reception unit 134.

Fourth Embodiment: Configuration Example of Function of Information Sharing Server 12-4

The information sharing server 12-4 illustrated in FIG. 20 includes the transmission and reception unit 41, the sharing information storage unit 42, the control unit 43, the content storage unit 44, the URL managing unit 45, the key generation unit 91, the key storage unit 92, the decryption unit 93, the encryption unit 94, and a user terminal managing unit 151.

Herein, when the information sharing server 12-4 of the fourth embodiment and the information sharing server 12-2 of the second embodiment described above are compared with each other, the information sharing server 12-4 is provided with the user terminal managing unit 151. Thus, in the following description, the user terminal managing unit 151 will be mainly described, and the description of the same configuration as the embodiments described above will be omitted.

The user terminal managing unit 151 manages the terminal information for each user. Accordingly, when a certain user has a plurality of terminals, the user terminal managing unit 151 manages the plurality terminals. In the fourth embodiment, when sending the request of the content to the content owner who performs sharing, the request may be sent to another terminal, not only one terminal. In addition, since a user manages one or a plurality of terminals, when sending the request of the content, it is possible to access to the IP address of each device linked to the terminal information to acquire the predetermined information. Further, when the plurality of terminal information items are allocated, a user may access every terminal, or may access the terminals in order, until the content is acquired according to the preset priority order.

In the example illustrated in FIG. 20, first, the control unit 43 outputs the terminal information (for example, terminal information of the terminal 11-4a) extracted from the sharing information to the user terminal managing unit 151. The user terminal managing unit 151 refers preset management information based on the obtained terminal information. The terminal information included in the sharing information and one or the plurality of terminal information items which sends request of the content are linked to the management information, and are managed. Accordingly, the user terminal managing unit 151 acquires the terminal information (for example, the terminal information of the terminal 11-4c) which sends the request of the content with respect to the terminal information (for example, the terminal information of the terminal 11-4a) obtained from the control unit 43, and outputs the terminal information to the control unit 43. Thus, the control unit 43 may send the request of the content to the terminal 11-4c.

In addition to the "key 1", the "key 1'", the "key 2", and the "key 2'" described above, the key generation unit 92 of the fourth embodiment generates key information (for example, a secret key "key 3" and a public key "key 3'") for concealing the terminal information of the terminal 11-4c. Accordingly, the information sharing server 12-4 performs encryption or decryption with respect to the information to communicate with the terminal 11-4c using the key 3 and key 3'. In addition, the key information (for example, key 3') is transmitted to the terminal 11-4c, in advance, for example.

Information Sharing Process Example of Fourth Embodiment

Figure 21:
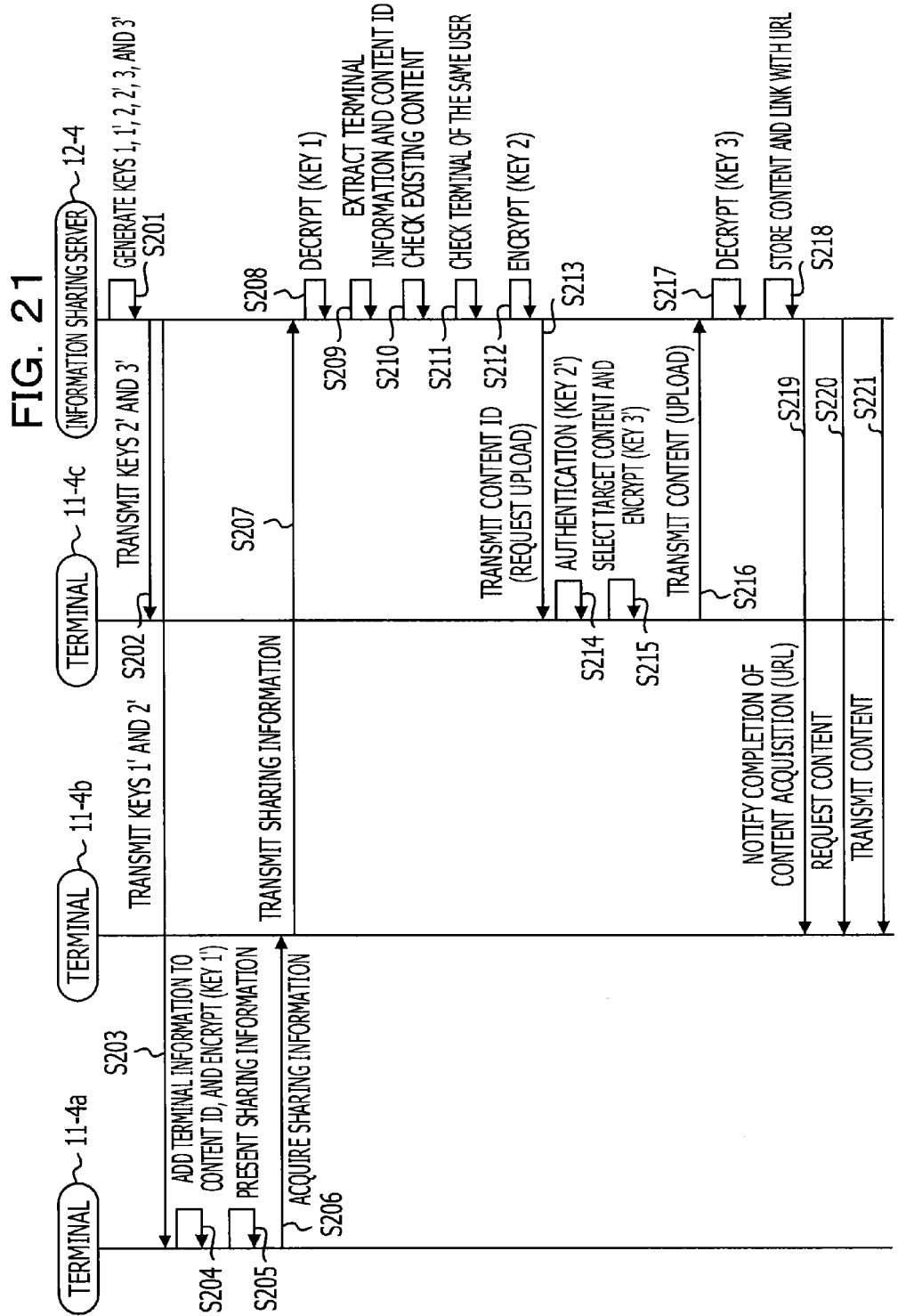
FIG. 21 is a sequence diagram illustrating an example of an information sharing process of the fourth embodiment.

Next, an example of an information sharing process of the fourth embodiment will be described with reference to FIG. 21. FIG. 21 is a sequence diagram illustrating the example of the information sharing process of the fourth embodiment. In addition, as an example, FIG. 21 includes the terminals 11-4a to 11-4c, and the information sharing server 12-4 described above.

In the information sharing process of the fourth embodiment, the information sharing server 12-4 generates the key information items (key 1, key 1', key 2, key 2', key 3, key 3',) (S201), and transmits the key 2' and the key 3' which are public keys from the generated key information items, to the terminal 11-4c (S202). In addition, the information sharing server 12-4 transmits the key 1' and the key 2' which are public keys to the terminal 12-4a (S203).

The terminal 11-4a adds the terminal information to the content ID corresponding to the content to be shared, and performs encryption with respect to the sharing information obtained by the adding, using the predetermined key information (for example, key 1') (S204). The encryption may be performed only for the terminal information. In addition, the terminal 11-4a presents the sharing information including the encrypted information (S205).

The terminal 11-4b acquires the sharing information from the terminal 11-4a (S206), and when a user desires to acquire the content (information to be shared) corresponding to the acquired sharing information, the sharing information is transmitted to the information sharing server 12-4 (S207). The information sharing server 12-4 performs decryption with respect to the sharing information obtained from the terminal 11-4b using the key information (for example, key 1) (S208), and extracts the terminal information and the content ID from the decrypted sharing information (S209).

Next, the information sharing server 12-4 checks whether or not there is already-existing content corresponding to the extracted terminal information and the content ID (S210), and when there is no already-existing content, the information sharing server 12-4 checks the terminal of the same user, based on the terminal information, and acquires the terminal information (for example, terminal 11-4c) which sends the request of the content (S211). Then, the information sharing server 12-4 performs encryption with respect to the content ID or the like using the predetermined key information (for example, key 2) (S212), and transmits the encrypted content ID to the terminal 11-4c corresponding to the terminal information to send the acquisition request (upload request) of the content (S213).

The terminal 11-4c performs authentication with respect to the content ID obtained from the information sharing server 12-4 using the predetermined key information (for example, key 2') (S214). In addition, when the result of the authentication is OK, the terminal 11-4c selects the target content, and performs encryption with respect to the selected content using the predetermined key information (for example, key 3') (S215). Further, the terminal 11-4c transmits (uploads) the encrypted content to the information sharing server 12-4 (S216).

The information sharing server 12-4 performs decryption with respect to the encrypted content obtained from the terminal 11-4c with the corresponding key information (for example, key 3) (S217), stores the decrypted content, and performs linking with the corresponding address (URL) of the storage destination (S218). In addition, the information sharing server 12-4 transmits the acquisition completion notification of the content including the linked URL to the terminal 11-4b (S219).

The terminal 11-4b sends request of the content to the information sharing server 12-4 from the URL included in the acquisition completion notification of the content obtained from the information sharing server 12-4 (S220). The information sharing server 12-4 transmits the content corresponding to the request of the content to the terminal 11-4b (S221). Thus, the terminal 11-4b may acquire the content.

In the information sharing process described above, when there is the already-existing content in the process of S210, the acquisition completion notification of the content including the URL corresponding to the already-existing content may be transmitted in the process of S219, without performing the processes of S211 to S218.

As described above, in the fourth embodiment, it is possible to send the request of the content to another terminal and to easily share the information.

Next, each content of the detailed information sharing process of the terminal 11-4a, the terminal 11-4b, the terminal 11-4c, and the information sharing server 12-4 will be described with reference to FIGS. 22 to 24. Since the terminal 11-4b performs the same process as the terminal 11-1b of the first embodiment described above, the detailed description thereof will be omitted.

Information Sharing Process Example of First Terminal of Fourth Embodiment

Figure 22:
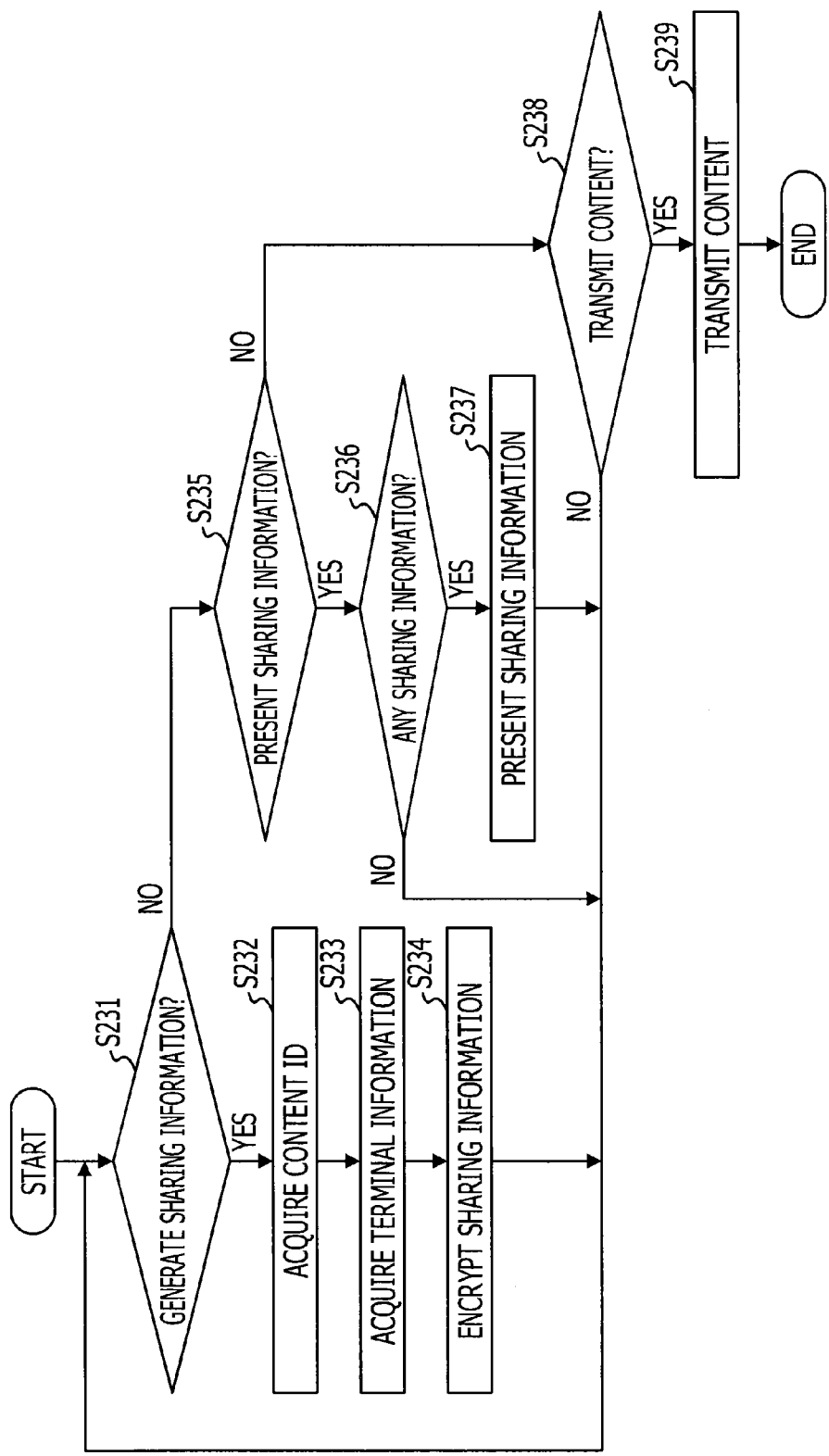
FIG. 22 is a flowchart illustrating an example of an information sharing process of a first terminal of the fourth embodiment.

FIG. 22 is a flowchart illustrating an example of the information sharing process of the first terminal of the fourth embodiment. First, the information sharing process of the first terminal illustrated in FIG. 22 determines whether or not to generate the sharing information corresponding to the information to be shared (content) (S231), and when generating the sharing information (YES in S231), the content ID which identifies the information to be shared is acquired (S232). In addition, the information sharing process acquires the terminal information of the first terminal (S233), encrypts the sharing information including the content ID and the terminal information (S234), and the process returns to the process of S231.

In the process of S231, in a case of not generating the sharing information (NO in S231), the information sharing process determines whether or not to present the generated sharing information (S235). When presenting the sharing information (YES in S235), the information sharing process determines whether or not there is the sharing information to be presented (S236), and when there is the sharing information (YES in S236), the sharing information is presented (S237). In addition, in the process of S235, in a case of not presenting the sharing information (NO in S235), the information sharing process determines whether or not to transmit the content corresponding to the sharing information to the third terminal (terminal 11-4c) (S238).

When transmitting the content (YES in S238), the information sharing process transmits content to the third terminal (S239). In the process of S239, the content ID which is set for identifying the content is also transmitted. In a case of not transmitting the content (NO in S238), the information sharing process returns to the process of S231. In addition, in the process of S236 of the information sharing process, when there is no sharing information (NO in S236) or after the process of S237, the process returns to the process of S231.

Information Sharing Process Example of Third Terminal of Fourth Embodiment

Figure 23:
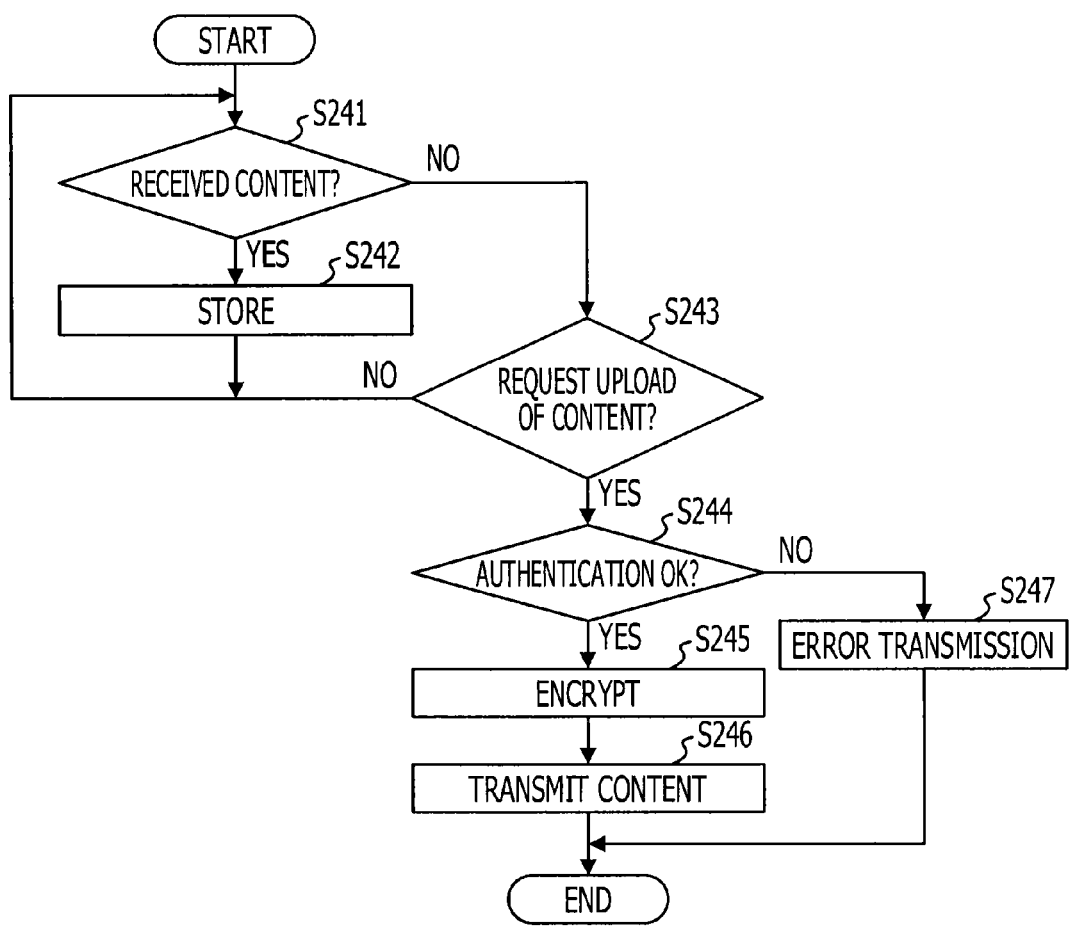
FIG. 23 is a flowchart illustrating an example of an information sharing process of a third terminal of the fourth embodiment.

FIG. 23 is a flowchart illustrating an example of the information sharing process of the third terminal of the fourth embodiment. First, the information sharing process of the third terminal illustrated in FIG. 23 determines whether or not content (including content ID) is received from the first terminal (S241), and when the content is received (YES in S241), the received content and content ID are stored (S242).

In the process of S241, when the content is not received (NO in S241), the information sharing process determines whether or not there is the upload request of the content from the information sharing server 12-4 (S243). In addition, when there is the upload request of the content (YES in S243), the information sharing process determines whether or not it is authenticated as OK (S244), and when it is authenticated as OK (YES in S244), the information sharing process performs encryption of the content with the predetermined key information (S245). Further, the information sharing process transmits the encrypted content to the information sharing server 12-4 (S246).

In the process of S244, when it is not authenticated as OK (NO in S244), the information sharing process transmits the error information (S247). When there is no upload request of the content (NO in S243), the information sharing process returns to the process of S241. In addition, in the information sharing process, the process returns to the process of S241 even after the process of S242.

Figure 24:
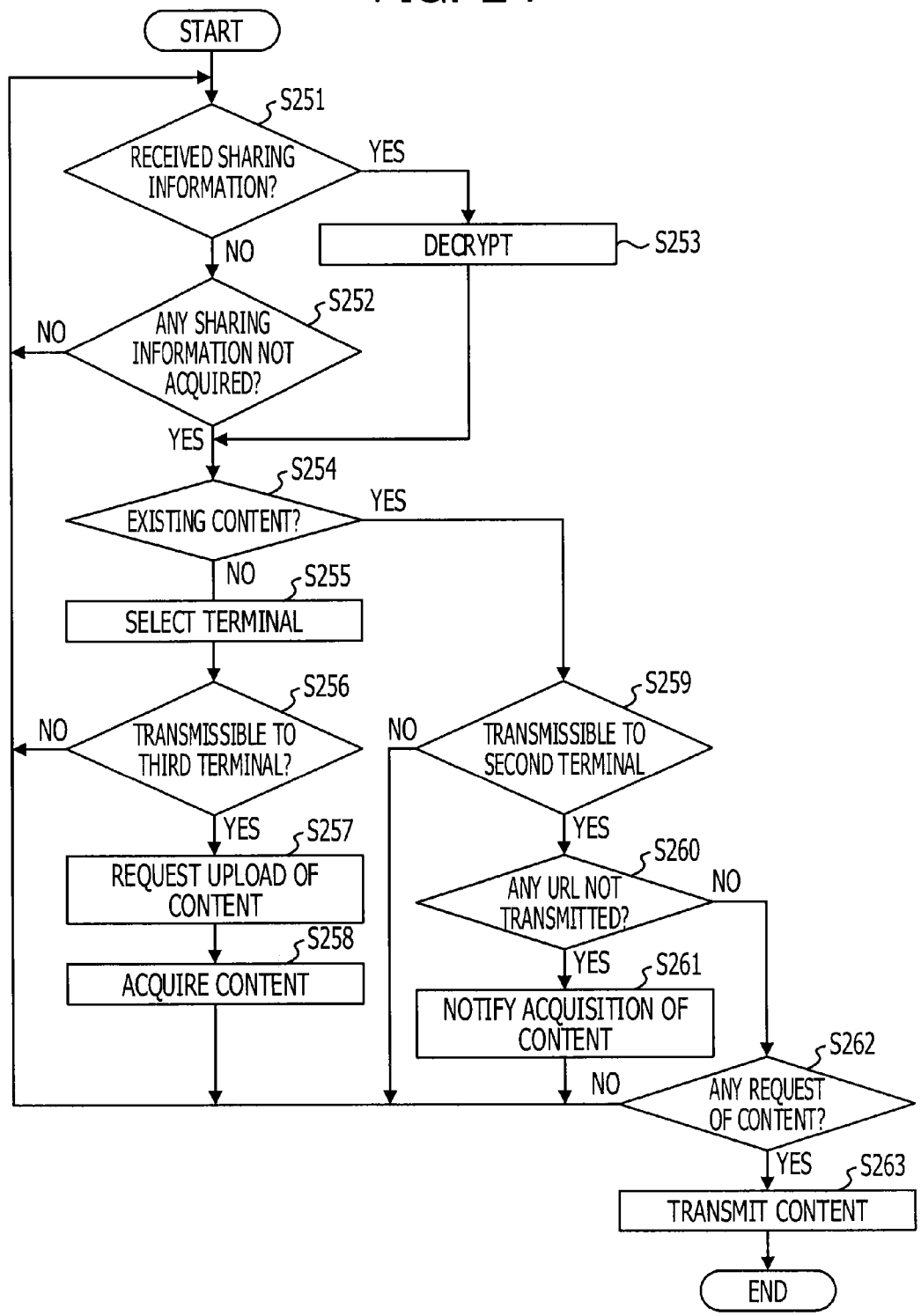
FIG. 24 is a flowchart illustrating an example of an information sharing process of an information sharing server of the fourth embodiment.

Information Sharing Process Example of Information Sharing Server 12-4 of Fourth Embodiment FIG. 24 is a flowchart illustrating an example of an information sharing process of the information sharing server of the fourth embodiment. The information sharing process of the information sharing server 12-4 illustrated in FIG. 24 determines whether or not the sharing information is received (S251), and when the sharing information is not received (NO in S251), the information sharing process determines whether or not there is sharing information not acquired (S252). When there is no sharing information not acquired (NO in S252), the information sharing process returns to the process of S251.

In addition, in the process of S251, when the sharing information is received (YES in S251), the information sharing process performs decryption with respect to the encrypted sharing information (S253). Herein, when there is the sharing information not acquired (YES in S252) or after the process of S253, the information sharing process determines whether or not there is content (already-existing content) which is already acquired in the content corresponding to the sharing information (S254).

When there is no already-existing content (NO in S254), the information sharing process selects the terminal information which sends the request of the content, based on the terminal information included in the sharing information (S255). In addition, in the process of S255, the terminal information of the third terminal is selected as the access destination of the request of the content corresponding to the terminal information of the first terminal, for example, however, management information which illustrates correspondence relationship or the like of the terminal information items is set, in advance.

Then, the information sharing process determines whether or not the information sharing server 12-4 may communicate with the third terminal (terminal 11-3c) selected in the process of S255 (S256). When the information sharing server 12-4 may communicate with the third terminal (YES in S256), the information sharing process sends the upload request of the content based on the content ID to the third terminal (S257), and acquires the corresponding content (S258), and the process returns to the process of S251. In addition, in the process of S255, when the information sharing server 12-4 may not communicate with the third terminal (NO in S256), the information sharing process returns to the process of S251.

In the process of S254, when there is the already-existing content (YES in S254), the information sharing process determines whether or not the information sharing server 12-4 may communicate with the second terminal (terminal 11-4b) (S259). When the information sharing server 12-4 may communicate with the second terminal (YES in S259), the information sharing process determines whether or not there is the URL not transmitted to the second terminal (S260). When there is the URL not transmitted (YES in S260), the information sharing process sends the acquisition notification of the content including the URL to the second terminal (S261), and the process returns to the process of S251. In addition, when there is no URL not transmitted (NO in S260), the information sharing process determines whether or not there is the request of the content based on the URL from the second terminal (S262), and when there is the request of the content (YES in S262), the content is transmitted to the second terminal (S262).

In addition, when there is no request of the content (NO in S262), the information sharing process returns to the process of S251. Further, in the process of S259, when the information sharing server 12-4 may not communicate with the second terminal (NO in S259), the information sharing process returns to the process of S251.

As described above, in the fourth embodiment, it is possible to send the request of the content of the sharing information obtained from the first terminal (terminal 11-4a) to the third terminal (terminal 11-4c). In addition, when there is no third terminal, it is possible to send the request of the content to another terminal by referring to the management information or the like. Thus, in the fourth embodiment, it is possible to easily share the information without configuration or setting for connecting the information sharing server 12-4 to the first terminal, for example.

Content of Information Sharing According to Fourth Embodiment

Figure 25:
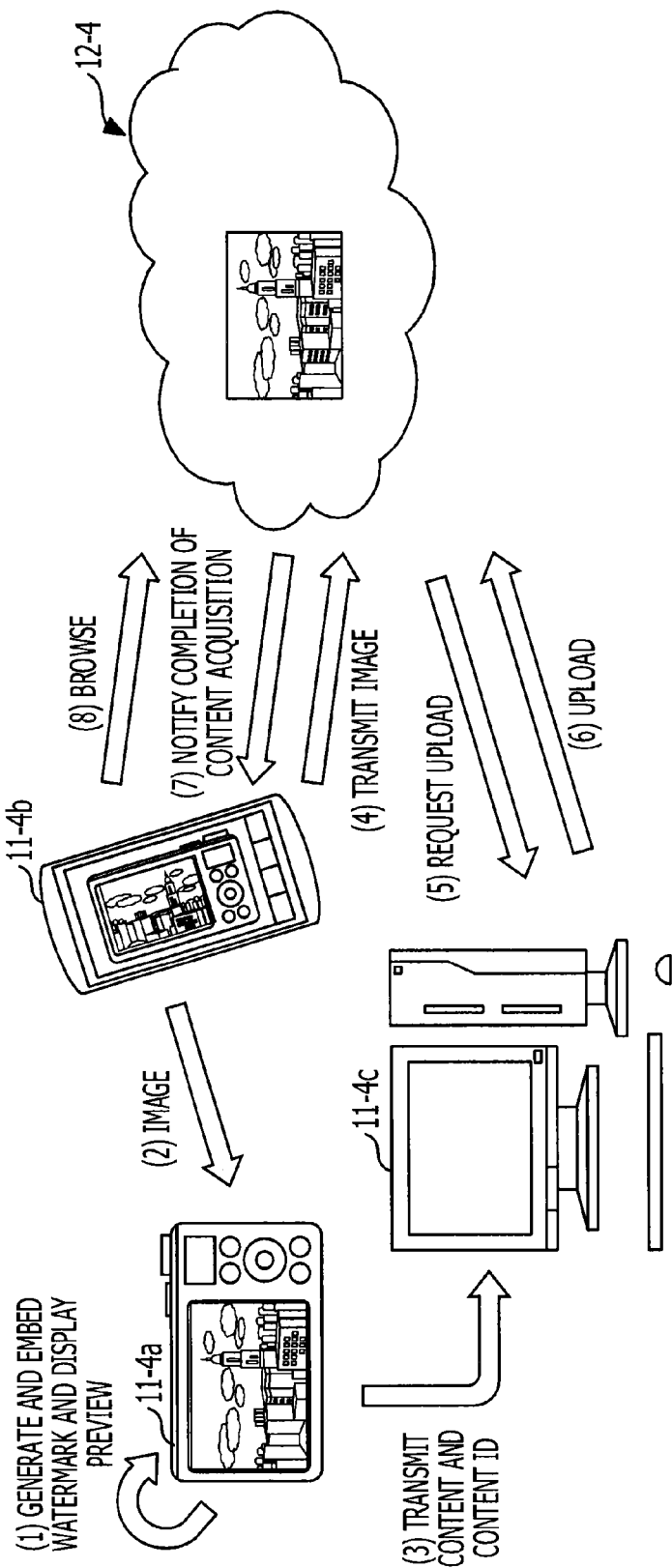
FIG. 25 is a diagram for illustrating content of information sharing according to the fourth embodiment.

Herein, the content of the information sharing according to the fourth embodiment will be described with reference to FIG. 25. FIG. 25 is a diagram for illustrating content of information sharing according to the fourth embodiment. In the example of FIG. 25, the content of the information sharing using the first terminal (terminal 11-4a), the second terminal (11-4b), the third terminal (11-4c), and the information sharing server 12-4 will be described, however, it is not limited thereto, and for example, the plurality of third terminals may exist. In addition, in the example of FIG. 25, the function of the information sharing server 12-4 described above is provided as a so-called cloud service, for example. Further, in FIG. 25, an example with the preview image to which the watermark information of the third embodiment described above is embedded is illustrated as a detailed example of the presentation of the sharing information; however, it is not limited thereto.

In the example of FIG. 25, in the fourth embodiment, the information sharing is performed with the procedure of (1) to (8) described above.

In detail, first, the terminal 11-4a of the content owner generates the watermark of the sharing information corresponding to the image to be shared, embeds the watermark information to the preview image of the image to be shared, and displays the preview on the screen ((1) of FIG. 25). Next, by capturing the displayed preview image with the camera included in the terminal 11-4b by the content owner, the sharer acquires the preview image to which the watermark is embedded ((2) of FIG. 25).

Then, the content owner sends the shared content and content ID to the terminal 11-4c ((3) of FIG. 25). The sending in this case may be short-distance wireless communication described above, may be the sending using a wired cable or the like, or may be the movement of the data using a recording medium.

Next, the sharer transmits the preview image to which the watermark is embedded from the terminal 11-4b, to the information sharing server 12-4 ((4) of FIG. 25). The information sharing server 12-4 selects the terminal to send the request of the content using the management information from the terminal information included in the watermark, and sends the upload request to the selected terminal 11-4c ((5) of FIG. 25). The terminal 11-4c uploads the target content to the information sharing server 12-4 according to the upload request from the information sharing server 12-4 ((6) of FIG. 25).

Herein, the information sharing server 12-4 stores the uploaded content in a certain location, performs the linking with the address information (URL) of the storage destination, and transmits the acquisition completion notification including the URL to the terminal 11-4b of the sharer ((7) of FIG. 25). Accordingly, the sharer may receive the acquisition completion notification of the content, acquire the content based on the URL or the like included in the acquisition completion notification of the content, and browse the content by displaying the content on the screen of the terminal 11-4b ((8) of FIG. 25). In addition, in the example of FIG. 25, the encryption or decryption process described above is not included, however, in the fourth embodiment, the encryption or decryption process may be performed, or may not be performed.

As described above, in the fourth embodiment, it is possible to send the request of the content of the sharing information obtained from the first terminal (terminal 11-4a) to the third terminal (terminal 11-4c) and to easily realize the information sharing. Thus, although the first terminal is a digital camera or a tablet device and may not perform the communication through the communication network 13 or the like, it is possible to easily share the information.

Fifth Embodiment: Schematic Configuration Example of Information Sharing System

Next, an information sharing system of a fifth embodiment will be described with reference to FIG. 26. FIG. 26 is a diagram illustrating an example of a schematic configuration of the information sharing system of the fifth embodiment. In addition, in an information sharing system 10-5 illustrated in FIG. 26, the configuration parts which are the same as the information sharing systems 10-1 to 10-4 of the first to fourth embodiments described above have the same reference numerals, and the detailed description thereof will be omitted, herein.

The information sharing system 10-5 illustrated in FIG. 26 includes a plurality of terminals 11-5a, 11-5b, 11-5c and 11-5d (hereinafter, referred to collectively as "terminals 11-5" if desired), and an information sharing server 12-5. In addition, except for the terminals 11-5a and 11-5b, the terminals 11-5 and the information sharing server 12-5 are connected in a state of being able to transmit and receive data through the communication network 13 or the like as described above.

When compared to the fourth embodiment described above, in the fifth embodiment, an example in which the configuration of the terminal (terminal 11-4b) of the sharer is separated into a plurality of devices (terminal 11-5b and the terminal 11-5d) will be illustrated. That is, the fifth embodiment includes a fourth terminal (terminal 11-5d), and the content owner side uses the terminals 11-5a and 11-5c, and the content sharer side uses the terminals 11-5b and 11-5d.

In the fifth embodiment, although the terminal 11-5b is a terminal which may not perform the communication with the information sharing server 12-5 or a terminal which is not in a environment to perform the communication, for example, it is possible to realize the sharing of the information.

Next, the fifth embodiment will be described in detail, however, when compared to the fourth embodiment, in the fifth embodiment, a configuration of the second terminal (terminal 11-5b) is changed, and the fourth terminal (terminal 11-5d) is newly added. Thus, in the following description, the configurations of the second terminal and the fourth terminal will be described.

Fifth Embodiment: Configuration Example of Function of Terminal 11-5b

The terminal 11-5b illustrated in FIG. 26 includes the sharing information acquisition unit 31, the sharing information storage unit 32, and a communication unit 161. The sharing information acquires the sharing information presented by the sharing information presentation unit 25 of the terminal 11-5a. The acquired sharing information is stored in the sharing information storage unit 32. In addition, when a user desires to acquire the content (information to be shared) corresponding to the sharing information stored in the sharing information storage unit 32, the terminal 11-5b transmits the sharing information to the terminal 11-5d through the communication unit 161. In addition, the communication by the communication unit 161 may be short-distance wireless communication or the like, such as infrared data communication or Bluetooth, but it is not limited thereto, and the communication may be communication using a wired cable or the like such as a USB cable, for example. Further, the communication unit 161 may perform movement of the data using a recording medium such as a SD card, for example.

Fifth Embodiment: Configuration Example of Function of Terminal 11-5*d*

The terminal 11-5*d* illustrated in FIG. 26 includes a communication unit 171, a sharing information storage unit 172, a transmission and reception unit 173, and a content browsing unit 174. The communication unit 171 receives sharing information from the terminal 11-5*b*. In addition, the communication unit 171 outputs the received sharing information to the sharing information storage unit 172. The sharing information storage unit 172 is a memory unit which stores the sharing information obtained from the communication unit 171.

The transmission and reception unit 173 transmits the sharing information stored in the sharing information storage unit 172 to the information sharing server 12-5. In addition, the transmission and reception unit 173 receives acquisition completion notification including address information of the storage destination of the information to be shared, for example, a URL, or receives the content as it is, from the information sharing server 12-5. Further, the transmission and reception unit 173 outputs the received acquisition completion notification or content to the content browsing unit 174 or stores in the sharing information storage unit 172. The content browsing unit 174 is a display unit which displays to browse the acquired content.

Information Sharing Process Example of Fifth Embodiment

Next, an example of an information sharing process of the fifth embodiment will be described with reference to FIG. 27. FIG. 27 is a sequence diagram illustrating the example of the information sharing process of the fifth embodiment. In addition, as an example, FIG. 27 includes the terminals 11-5*a* to 11-5*d*, and the information sharing server 12-5 described above.

In the information sharing process of the fifth embodiment, the information sharing server 12-5 generates the key information items (key 1, key 1', key 2, key 2', key 3, key 3',) (S281), and transmits the key 2' and the key 3' which are public keys from the generated key information items, to the terminal 11-5*c* (S272). In addition, the information sharing server 12-5 transmits the key 1' and the key 2' which are public keys to the terminal 12-5*a* (S273).

The terminal 11-5*a* adds the terminal information to the content ID corresponding to the content to be shared, and performs encryption with respect to the sharing information obtained by the adding, using the predetermined key information (for example, key 1') (S274). The encryption may be performed only for the terminal information. In addition, the terminal 11-5*a* presents the sharing information including the encrypted information (S275).

The terminal 11-5*b* acquires the sharing information from the terminal 11-5*a* (S276), and when a user desires to acquire the content (information to be shared) corresponding to the acquired sharing information, the sharing information is transmitted to the terminal 11-5*d* (S277). The terminal 11-5*d* transmits the sharing information obtained from the terminal 11-5*b* to the information sharing server 12-5 (S278).

The information sharing server 12-5 performs decryption with respect to the sharing information obtained from the terminal 11-5*d* using the key information (for example, key 1) (S279), and extracts the terminal information and the content ID from the decrypted sharing information (S280).

Next, the information sharing server 12-5 checks whether or not there is already-existing content corresponding to the extracted terminal information and the content ID (S281), and when there is no already-existing content, the information sharing server 12-5 checks the terminal of the same user, based on the terminal information, and acquires the terminal information (for example, terminal 11-5*c*) which sends the request of the content (S282). Then, the information sharing server 12-5 performs encryption with respect to the content ID or the like using the predetermined key information (for example, key 2) (S283). In addition, the information sharing server 12-5 transmits the encrypted content ID to the terminal 11-5*c* corresponding to the terminal information to send the acquisition request (upload request) of the content (S284).

The terminal 11-5*c* performs authentication with respect to the content ID obtained from the information sharing server 12-5 using the predetermined key information (for example, key 2') (S285). In addition, when the result of the authentication is OK, the terminal 11-5*c* selects the target content, and performs encryption with respect to the selected content using the predetermined key information (for example, key 3') (S286). Further, the terminal 11-5*c* transmits (uploads) the encrypted content to the information sharing server 12-5 (S287).

The information sharing server 12-5 performs decryption with respect to the encrypted content obtained from the terminal 11-5*c* with the corresponding key information (for example, key 3) (S288), stores the decrypted content, and performs linking with the corresponding address (URL) of the storage destination (S289). In addition, the information sharing server 12-5 transmits the acquisition completion notification of the content including the linked URL to the terminal 11-5*d* (S290).

The terminal 11-5*d* sends request of the content to the information sharing server 12-5 from the URL included in the acquisition completion notification of the content obtained from the information sharing server 12-5 (S291). The information sharing server 12-5 transmits the content corresponding to the request of the content to the terminal 11-5*d* (S292). Thus, the terminal 11-5*d* may acquire the content.

In addition, in the information sharing process described above, when there is the already-existing content in the process of S281, the acquisition completion notification of the content including the URL corresponding to the already-existing content may be transmitted in the process of S290, without performing the processes of S282 to S289.

As described above, in the fifth embodiment, it is possible to easily share the information, although the terminal (for example, second terminal) of the sharer is a device which may not perform communication using the communication network 13, such as a digital camera. In addition, except for the communication part of the sharing information by the communication unit, the information sharing process of the second terminal and the fourth terminal of the fifth embodiment is the process obtained by separating the process of the second terminal of each embodiment described above. Further, the same process as the process content of the fourth embodiment described above may be applied for the information sharing process of the first terminal, third terminal, and the information sharing server 12-5. Accordingly, the detailed description of the process content of each device of the fifth embodiment will be omitted.

According to embodiments described above, it is possible to reduce time and effort of the content owner side and to easily share the information. In addition, according to the embodiments described above, it is possible to perform the sharing setting even in an environment where the sharing operation is difficult. Also, by designating the content to be uploaded by the sharer side, it is possible to acquire only the content which the sharer desires to see, without causing stress to the content owner. In each embodiment described above, the entire or a part of the plurality of embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling an information processing apparatus, the method comprising:
   receiving sharing information for sharing content from a first terminal remotely connected to the information processing apparatus via a network;
   sending, by a communication interface of the information processing apparatus, an acquisition request for the contents to a second terminal remotely connected to the information processing apparatus via the network on a basis of the sharing information;
   acquiring the contents from the second terminal after the sending an acquisition request; and
   transmitting acquisition completion notification to the first terminal after the acquiring the contents.

2. The method according to claim 1, further comprising:
   receiving an acquisition request for the contents from the first terminal after the transmitting acquisition completion notification; and
   transmitting the contents to the first terminal after the receiving an acquisition request.

3. The method according to claim 1, wherein
   the sharing information includes identification information of the contents and encrypted terminal information of the second terminal.

4. The method according to claim 1, wherein
   the sharing information includes identification information which identifies a plurality of the contents.

5. The method according to claim 1, further comprising:
   transmitting storage destination information of the contents to the first terminal after the receiving sharing information when the contents is stored in a storage device.

6. The method according to claim 1, further comprising:
   extracting watermark information from image information in the sharing information, and
   wherein the sending an acquisition request includes sending the acquisition request on a basis of the watermark information.

7. The method according to claim 1, further comprising:
   sending an acquisition request of the contents to a third terminal different from the second terminal on a basis of the sharing information.

8. The method according to claim 1, further comprising:
   receiving the sharing information from a third terminal different from the first terminal.

9. The method of claim 1, wherein
   the information processing apparatus is a server connected to the first and second terminals via the network.

10. An information processing apparatus comprising:
    a memory; and
    a processor coupled to the memory, wherein the processor is configured to
    receive sharing information for sharing contents from a first terminal remotely connected to the information processing apparatus via a network,
    send an acquisition request for the contents to a second terminal remotely connected to the information processing apparatus via the network on a basis of the sharing information,
    acquire the contents from the second terminal after the sending an acquisition request, and
    transmit an acquisition completion notification to the first terminal after the acquiring the contents.

11. The information processing apparatus according to claim 10, wherein the processor is further configured to:
    receive an acquisition request for the contents from the first terminal after the transmitting acquisition completion notification; and
    transmit the contents to the first terminal after the receiving an acquisition request.

12. The information processing apparatus according to claim 10, wherein
    the information processing apparatus is a server connected to the first and second terminals via the network.

13. A non-transitory computer recording storage medium that stores a program causing the information processing apparatus to execute a process comprising:
    receiving sharing information for sharing contents from a first terminal remotely connected to the information processing apparatus via a network;
    sending an acquisition request for the contents to a second terminal remotely connected to the information processing apparatus via the network on a basis of the sharing information;
    acquiring the contents from the second terminal after the sending an acquisition request; and
    transmitting acquisition completion notification to the first terminal after the acquiring the contents.

14. The non-transitory computer recording storage medium of claim 13, the process further comprising:
    receiving an acquisition request for the contents from the first terminal after the transmitting acquisition completion notification; and
    transmitting the contents to the first terminal after the receiving an acquisition request.

15. The non-transitory computer recording storage medium of claim 13, wherein
    the information processing apparatus is a server connected to the first and second terminals via the network.

* * * * *